(12) United States Patent
Wyatt

(10) Patent No.: US 11,328,286 B2
(45) Date of Patent: May 10, 2022

(54) MULTI-FUNCTION ELECTRONIC PAYMENT CARD AND DEVICE SYSTEM

(71) Applicant: CARDWARE, INC, San Jose, CA (US)

(72) Inventor: David Wyatt, San Jose, CA (US)

(73) Assignee: CARDWARE, INC., San Jose, CA (US)

( * ) Notice: Subject to any disclaimer, the term of this patent is extended or adjusted under 35 U.S.C. 154(b) by 0 days.

(21) Appl. No.: 16/854,829

(22) Filed: Apr. 21, 2020

(65) Prior Publication Data

US 2021/0027276 A1  Jan. 28, 2021

Related U.S. Application Data

(63) Continuation of application No. 16/025,829, filed on Jul. 2, 2018, now Pat. No. 10,628,820, which is a
(Continued)

(51) Int. Cl.
*G06Q 20/34* (2012.01)
*G07F 19/00* (2006.01)
(Continued)

(52) U.S. Cl.
CPC ..... *G06Q 20/341* (2013.01); *G06K 19/06206* (2013.01); *G06K 19/0716* (2013.01);
(Continued)

(58) Field of Classification Search
CPC .... G06Q 20/341; G06Q 20/06; G06Q 20/065; G06Q 20/223; G06Q 20/24;
(Continued)

(56) References Cited

U.S. PATENT DOCUMENTS 5,276,311 A   1/1994   Hennige
6,000,832 A   12/1999  Franklin et al.
(Continued)

FOREIGN PATENT DOCUMENTS

WO   2012154915 A1   11/2012

*Primary Examiner* — Seung H Lee

(57) ABSTRACT

Embodiments include multi-function electronic payment card and device systems capable of generating a programmed magnetic field of alternating polarity based on a speed of a card swipe, and methods for constructing the device for the purpose of emulating a standard credit card. An apparatus is described to allow the device to emulate behavior of a credit card when used in electronic credit card readers. Additionally methods are described to allow user control of the device for the purpose of authorizing or controlling use of the device in the application of credit, debit and cash transactions, including cryptocurrency and card-to-card transactions. Methods are also described for generating a limited-duration credit card number when performing a transaction for the purpose of creating a limited-use credit card number, which is limited in scope of use to a predetermined number of authorized transactions. Furthermore the device may interact with other similar devices in proximity for the purpose of funds or credit/debit transfers.

27 Claims, 13 Drawing Sheets

Related U.S. Application Data continuation of application No. 15/250,698, filed on Aug. 29, 2016, now Pat. No. 10,013,693, which is a continuation of application No. 14/680,946, filed on Apr. 7, 2015, now Pat. No. 9,430,765, which is a continuation of application No. 14/217,261, filed on Mar. 17, 2014, now Pat. No. 9,022,286.

(60) Provisional application No. 61/794,891, filed on Mar. 15, 2013.

(51) Int. Cl.

| | | |
|---|---|---|
| *G06Q 20/06* | (2012.01) | |
| *G06Q 20/22* | (2012.01) | |
| *G06Q 20/38* | (2012.01) | |
| *G07F 7/08* | (2006.01) | |
| *G06K 19/06* | (2006.01) | |
| *G06K 19/07* | (2006.01) | |
| *G06K 19/077* | (2006.01) | |
| *G06Q 20/24* | (2012.01) | |
| *G06Q 20/40* | (2012.01) | |

(52) U.S. Cl.
CPC ....... *G06K 19/07749* (2013.01); *G06Q 20/06* (2013.01); *G06Q 20/065* (2013.01); *G06Q 20/223* (2013.01); *G06Q 20/24* (2013.01); *G06Q 20/346* (2013.01); *G06Q 20/347* (2013.01); *G06Q 20/352* (2013.01); *G06Q 20/385* (2013.01); *G06Q 20/3827* (2013.01); *G06Q 20/409* (2013.01); *G06Q 20/4012* (2013.01); *G07F 7/0873* (2013.01); *G07F 19/00* (2013.01)

(58) Field of Classification Search
CPC .. G06Q 20/346; G06Q 20/347; G06Q 20/352; G06Q 20/3827; G06Q 20/385; G06Q 20/4012; G06Q 20/409; G06K 19/06206; G06K 19/0716; G06K 19/07749; G07F 7/0873; G07F 19/00
See application file for complete search history.

(56) References Cited

U.S. PATENT DOCUMENTS

| | | |
|---|---|---|
| 7,100,821 B2 | 9/2006 | Rasti |
| 7,922,082 B2 | 4/2011 | Muscato |
| 8,517,276 B2 | 8/2013 | Mullen et al. |
| 8,571,937 B2 | 10/2013 | Rose et al. |
| 8,628,012 B1 | 1/2014 | Wallner |
| 8,671,055 B2 | 3/2014 | Spodak et al. |
| 8,690,055 B2 | 4/2014 | Anderson et al. |
| 8,690,059 B1 | 4/2014 | Wallner |
| 8,788,418 B2 | 7/2014 | Spodak et al. |
| 8,814,046 B1 | 8/2014 | Wallner |
| 8,827,153 B1 | 9/2014 | Rhoades et al. |
| 8,851,370 B2 | 10/2014 | DiMuro |
| 8,870,081 B2 | 10/2014 | Olson et al. |
| 9,022,285 B2 | 5/2015 | Graylin |
| 9,105,020 B2 | 8/2015 | Ronca et al. |
| 9,123,036 B2 | 9/2015 | Graylin et al. |
| 9,129,270 B2 | 9/2015 | Spodak |
| 9,177,241 B2 | 11/2015 | Spodak et al. |
| 9,195,926 B2 | 11/2015 | Spodak |
| 9,218,557 B2 | 12/2015 | Spodak et al. |
| 9,286,561 B2 | 3/2016 | Olson et al. |
| 9,406,011 B2 | 8/2016 | Bartenstein et al. |
| 9,412,105 B2 | 8/2016 | Graylin et al. |
| 9,547,816 B2 | 1/2017 | Mullen et al. |
| 9,646,301 B2 | 5/2017 | DiMuro |
| 9,734,345 B2 | 8/2017 | Spodak et al. |
| 9,818,104 B1 | 11/2017 | Katzer et al. |
| 9,864,994 B2 | 1/2018 | Huang et al. |
| 10,032,100 B2 | 7/2018 | Mullen et al. |
| 10,037,524 B2 | 7/2018 | Royyuru et al. |
| 10,223,631 B2 | 3/2019 | Mullen et al. |
| 10,255,545 B2 | 4/2019 | Mullen et al. |
| 11,100,431 B2 | 8/2021 | Mullen et al. |
| 2002/0073045 A1 | 6/2002 | Rubin et al. |
| 2002/0153424 A1 | 10/2002 | Li |
| 2003/0195842 A1 | 10/2003 | Reece |
| 2008/0222047 A1 | 9/2008 | Boalt |
| 2009/0048971 A1 | 2/2009 | Hathaway et al. |
| 2011/0276416 A1 | 11/2011 | Mullen et al. |
| 2013/0159186 A1* | 6/2013 | Brudnicki ........... H04W 12/068 705/44 |
| 2014/0164154 A1* | 6/2014 | Ramaci ................ G07F 7/0893 705/16 |
| 2015/0317632 A1 | 11/2015 | Park et al. |
| 2016/0125417 A1 | 5/2016 | Huang et al. |

* cited by examiner

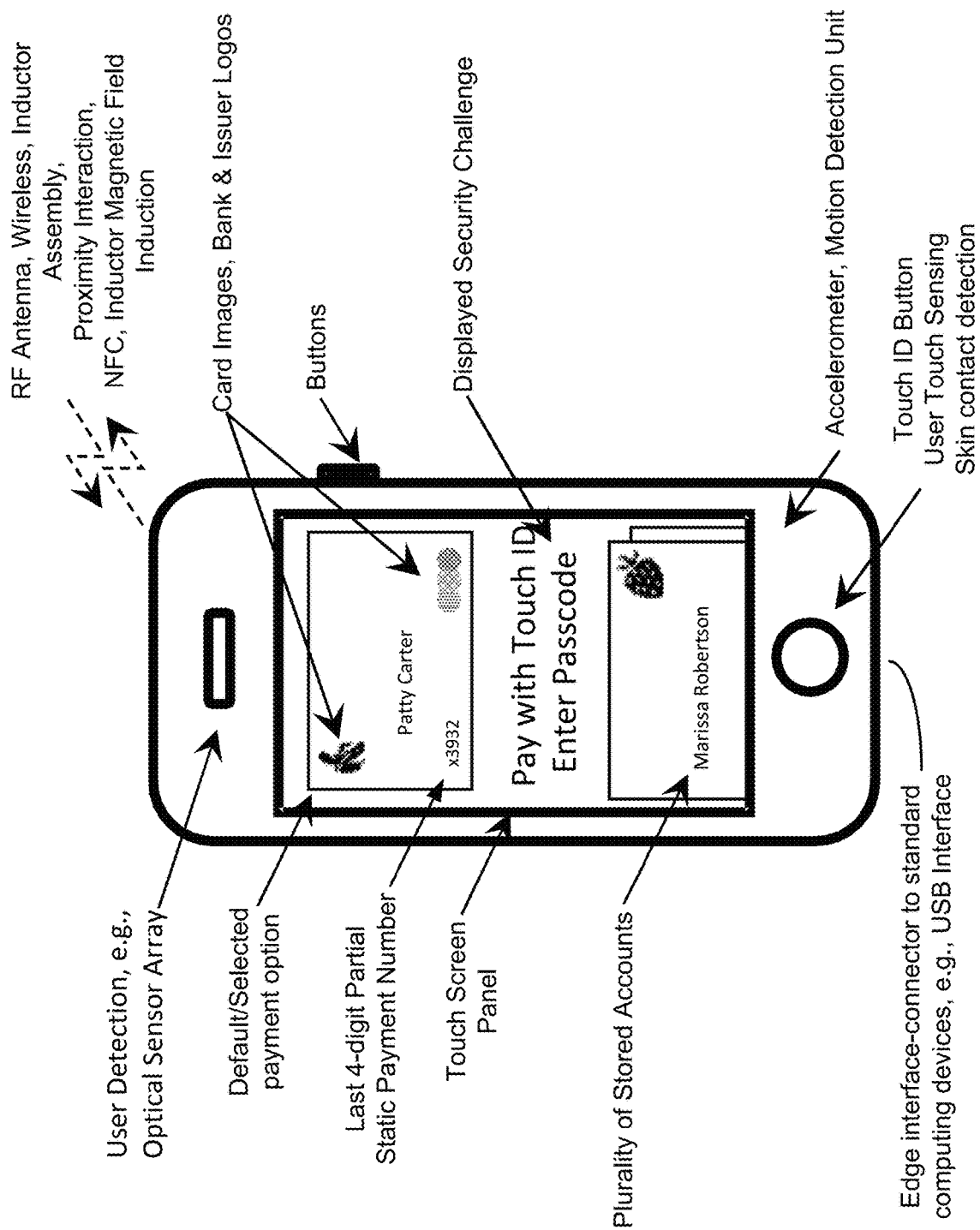

MULTI-FUNCTION ELECTRONIC PAYMENT CARD AND DEVICE SYSTEM

RELATED APPLICATIONS

This is a Continuation application of commonly-owned U.S. patent application Ser. No. 16/025,829, now U.S. Pat. No. 10,628,820, filed Jul. 2, 2018, which in turn was a Continuation application of commonly-owned U.S. patent application Ser. No. 15/250,698, now U.S. Pat. No. 10,013,693, filed Aug. 29, 2016, which in turn was a continuation of U.S. patent application Ser. No. 14/680,946, now U.S. Pat. No. 9,430,765 entitled "MULTI-FUNCTIONAL CREDIT CARD TYPE PORTABLE ELECTRONIC DEVICE," filed Apr. 7, 2015 to inventor David Wyatt, which is itself a continuation of U.S. patent application Ser. No. 14/217,261, now U.S. Pat. No. 9,022,286, similarly entitled "MULTI-FUNCTIONAL CREDIT CARD TYPE PORTABLE ELECTRONIC DEVICE," filed Mar. 17, 2014 by the same inventor David Wyatt, and claims the benefit of U.S. Provisional Patent No. 61/794,891 entitled "Multi-Functional Credit Card Device," filed Mar. 15, 2013 to inventor David Wyatt. The benefit of the earlier filing dates is hereby claimed and the contents of the earlier filed related applications are further incorporated by reference in their entirety.

FIELD OF THE INVENTION

Embodiments according to the present disclosure generally relate to electronic or smart multi-function electronic devices and, more specifically, to more secure, smart multi-function electronic payment card and device systems and transaction processing thereof.

BACKGROUND OF THE INVENTION

There are several different types of credit cards available in the marketplace at present. A first type of credit card is a conventional, standard piece of plastic with a magnetic strip, which is readily available and in wide commercial use. The advantage of this first type of credit card is that a large portion of the infrastructure for credit card transactions is built around this type of card, and consequently such a card works in a wide array of vendors' credit card machines, automated teller machines (ATMs), and other devices that support the present credit card and banking infrastructure.

Another type of credit card device employs the use of a smart integrated circuit chip. These types of credit cards have a built in microprocessor with cryptographic capabilities. These microprocessors operate in a similar manner to a cell phone having a chip comprising a cryptographic processor. Such a smart card device requires contact with a reader in order to be read and to perform a transaction. The reader provides the manner in which a facility interacts with the built-in processor on the card, e.g., for purposes of performing verification on the authenticity of the card or for making a direct deposit on the card. These credit card devices also comprise a magnetic strip such that they are compatible with standard plastic credit card readers in wide use.

A different type of credit card device in circulation employs radio frequency identification ("RFID"). These cards essentially have a low-power RF antenna built into the card, and when the cardholder passes the antenna in front of a reader comprising an RF field, enough power is generated to enable the processor to interact wirelessly with the receiving device.

A concern with each of these types of credit cards presently available in the marketplace is that they can all be, in various ways, susceptible to theft and/or compromise. Therefore, these types of credit cards have security limitations. Further, cards employing smart integrated circuit chips and RF technology are not in wide use at present because they are incompatible with existing credit card infrastructure, which still predominantly supports conventional plastic credit cards.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An embodiment includes a multi-function electronic device capable of generating a programmed magnetic field of alternating polarity based on a speed of a card swipe, and methods for constructing the device for the purpose of emulating a standard credit card. An apparatus is described to allow said device to emulate behavior of a credit card when used in electronic credit card readers. Additionally methods are described to allow user control of said device for the purpose of authorizing or controlling use of said device in the application of credit, debit and cash transactions, including cryptocurrency and card-to-card transactions. Methods are also described for generating a limited-duration credit card number when performing a transaction for the purpose of creating a limited-use credit card number, which is limited in scope of use to a predetermined number of authorized transactions. Furthermore said device may interact with other similar devices in proximity for the purpose of funds or credit/debit transfers.

More specifically, an aspect of the present disclosure provides an apparatus comprising: a thin card shaped sized body; a memory operative to store a plurality of identification data; a processor coupled to the memory; a user interface for selecting a select identification data of said plurality of identification data; a magnetic card reader detection unit for determining if the body is adjacent to a standard magnetic card reader; and an inductor assembly coupled to the processor and integrated into the body, the inductor assembly under processor control for generating a magnetic field of alternating polarity responsive to the body being detected as adjacent to a standard magnetic card reader, the magnetic field generated in a region substantially encompassing the standard magnetic card reader, wherein the magnetic field encodes said select identification data, and wherein the magnetic field is operable to be read by a magnetic read head of the standard magnetic card reader.

According to another aspect of the present disclosure, a multi-function electronic device comprises: a near-field communication (NFC) unit; a touch sensor array; a display; a motion rate detection array; a memory, storing a user data and a currency amount; and a processor operatively coupled to the NFC unit, the touch sensor array, the display, the motion rate detection array, and the memory; and wherein the processor initiates a card-to-card transaction between two multi-function electronic devices by a detected proximity of a first multi-function electronic device and a second multi-function electronic device and an input of information by a first user via said touch sensor array, and wherein the card-to-card transaction comprises an exchange of stored currency and said user data between the first multi-function electronic device and the second multi-function electronic device via the NFC unit.

According to yet another aspect of the present disclosure, a method of performing a transaction comprises: receiving an input signal at a multi-function electronic device from a user enabling operation of a near-field communication (NFC) unit of the multi-function electronic device; receiving an indication of an amount of currency for a transaction; generating at said multi-function electronic device a limited-duration credit card number; and transmitting said limited-duration credit card number from said multi-function electronic device to a recipient of the transaction.

BRIEF DESCRIPTION OF THE DRAWINGS

Embodiments of the present disclosure are illustrated by way of example, and not by way of limitation, in the figures of the accompanying drawings and in which like reference numerals refer to similar elements.

FIG. 8A illustrates an exemplary multifunction electronic device, in accordance with embodiments of the present invention.

DETAILED DESCRIPTION OF THE INVENTION

Figure 1:
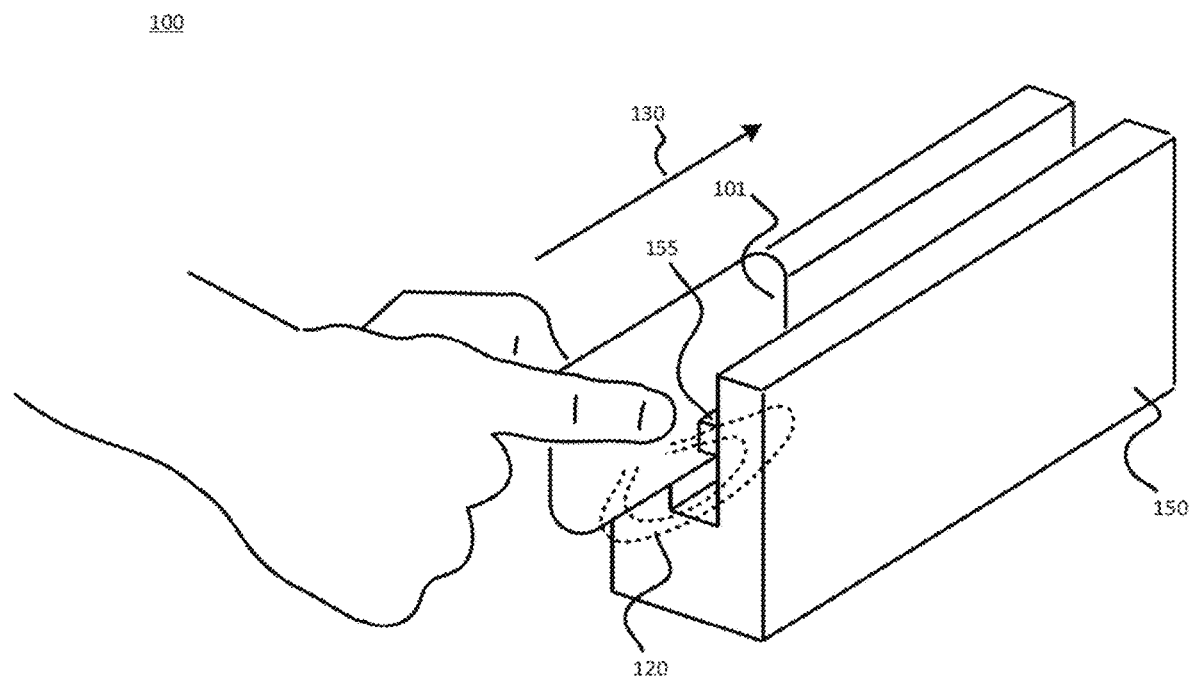
FIG. 1 is an illustration depicting an exemplary interaction between a multi-function electronic device and a standard magnetic card reader, according to an embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting", "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Encoding Via an Alternating Polarity of a Magnetic Field

In one embodiment of the present disclosure, a smart multi-function electronic device comprises a dynamic magnetic region (strip) incorporating a main inductor assembly from which programmed magnetic field data symbols are dynamically generated. In one embodiment the inductor assembly may be a planar coil formed within the material that embodies the multi-function electronic device. An advantage of using a planar coil is that it can dynamically produce a magnetic field in such a manner as to emulate the interaction between a traditional magnetic strip and a conventional credit card reader. As the magnetic strip of a conventional credit card is passed through a magnetic reader head, stripes of alternating magnetic polarity embedded in the strip induce a magnetic field of alternating polarity at the reader head. The pattern formed by the alternating polarity of the magnetic field encodes information, which when transformed by a transducer to a current signal in the magnetic reader head, provides user information for a transaction.

Embodiments of the present disclosure provide a multi-function electronic device able to generate a programmed magnetic field, wherein data is encoded and represented by an alternating polarity of the generated magnetic field. In a similar manner to a conventional plastic credit card, the magnetic field produced by the planar coil is able to be read by a pickup (or "transducer") and to thereby transmit information to the magnetic card reader. FIG. 1 illustrates a credit card transaction 100 performed between a multi-function electronic device 101 and a conventional magnetic reader 150. The multi-function electronic device 101 generates a magnetic field of alternating polarity 120 to be read by the conventional magnetic card reader 150, according to an embodiment of the present disclosure. The multi-function electronic device 101 is moved at a rate 130 relative to a magnetic reader head 155 of conventional magnetic card reader 150. The magnetic field 120 extends with sufficient distance and intensity from 101 so as to be read by magnetic head reader 155. The magnetic head reader 155 responds to the magnetic field 120 by producing a current in the conventional fashion, which is then interpreted as encoded information by the magnetic reader 150. Therefore the magnetic field of alternating polarity 120 produced by the multi-function electronic device 101 has a substantially identical encoding effect as a traditional magnetic strip.

A characteristic of encoding information in a conventional magnetic card strip is that binary information is encoded by the pattern of alternating magnetic polarity formed by ferromagnetic stripes embedded on the magnetic strip. As the conventional magnetic card strip has a standardized format, the encoding of information is provided at a specified data density (bits per inch), according to which conventional magnetic readers are designed for interpretation of encoded data. In order to most ably emulate a conventional credit card interaction with a conventional magnetic reader the multi-function electronic device 101 of the present disclosure is provided with a means of determining a substantially optimal rate for alternating the polarity of the generated magnetic field 120 in order to produce data at a rate which is able to be readily received and correctly interpreted by the conventional magnetic reader 150. Embodiments of the present disclosure provide several means of determining the relative movement rate 130 between the multi-function electronic device 101 and the magnetic reader head 155. These features, as well as other characteristics of the multi-function electronic device of the present disclosure, can be better appreciated by a description of the internal components and functions of multi-function electronic device 101.

Figure 2A:
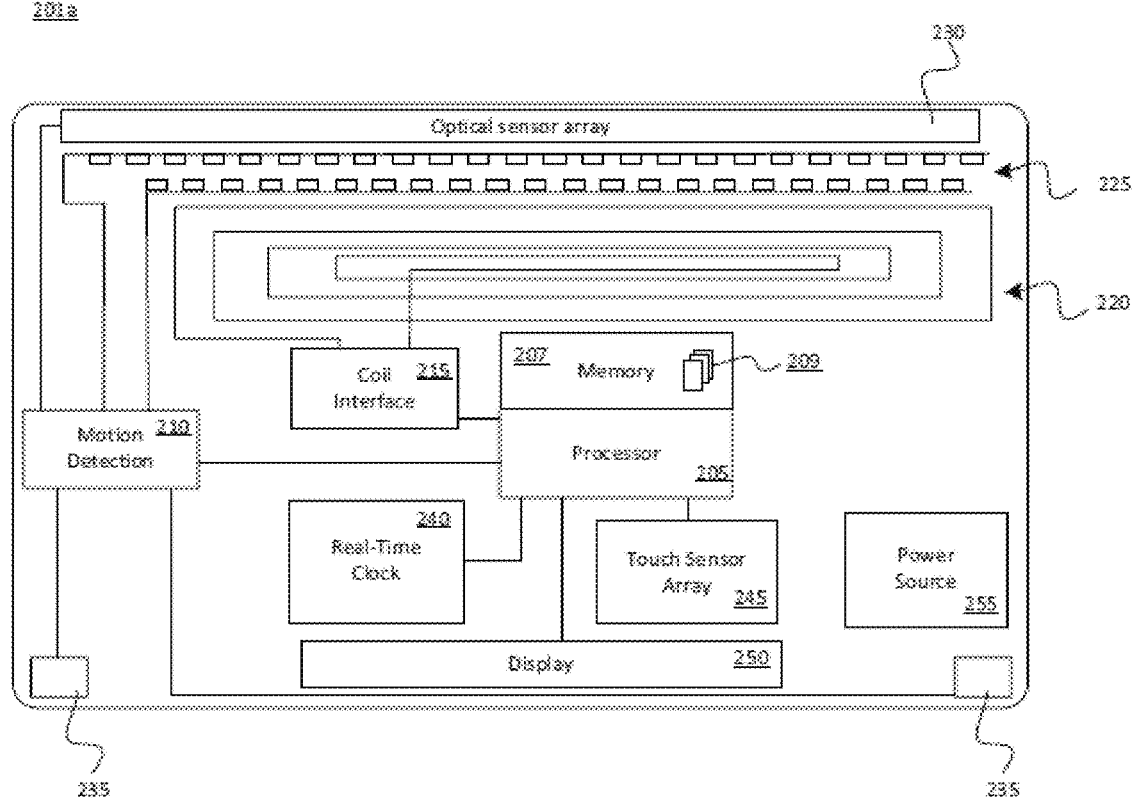
FIGS. 2A-2B are block diagrams illustrating data flow between the magnetic coils on the multi-function electronic device and the microprocessor on the multi-function electronic device according to an embodiment of the present disclosure.
Figure 2B:
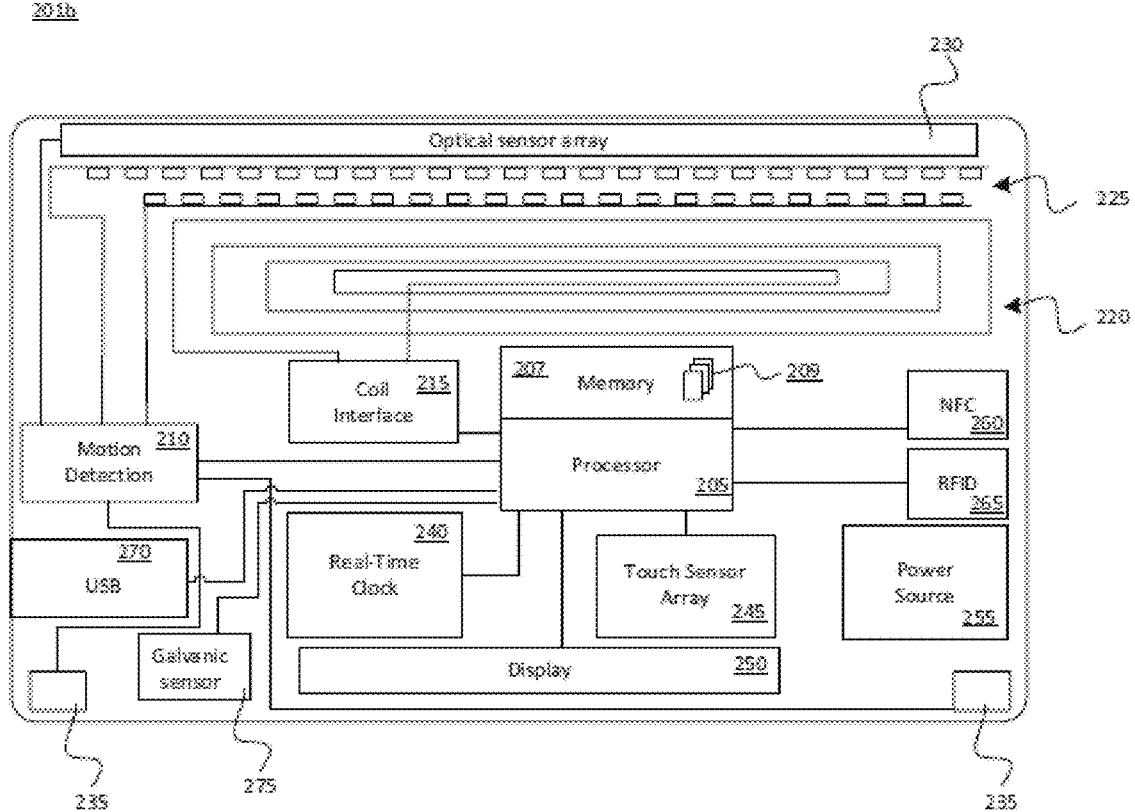
Figure 8B:
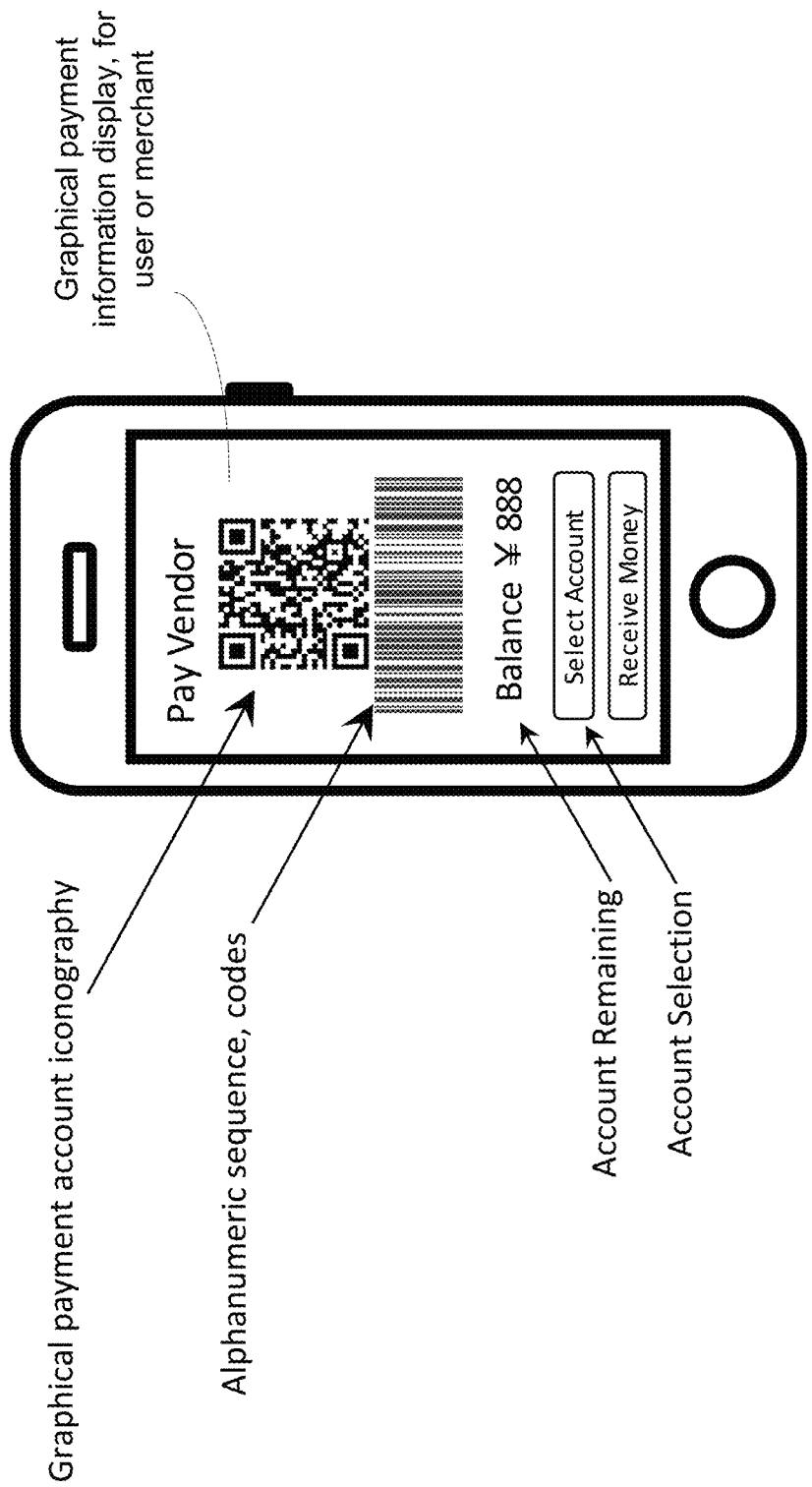
FIG. 8B illustrates exemplary displayed characteristics of multifunction electronic device, in accordance with embodiments of the present invention.

FIGS. 2A and 2B depict exemplary embodiments of a smart multi-function electronic device, in a block diagram view. The components of the block diagram are illustrated according to functional connections, and their locations should not be construed as being limited to the respective locations as depicted in FIGS. 2A-2B. In FIG. 2A, multi-function electronic device 201a is shown in a block diagram view. Multi-function electronic device 201a comprises a processor 205 and a memory unit 207, the processor 205 operatively coupled to the components of multi-function electronic device 201a. The memory 207 comprises a plurality of accounts 209, which may be credit card accounts, banking accounts, merchant accounts, online accounts, cryptocurrency accounts, and combinations thereof. A motion detection module 210 is coupled to the processor unit 205 and to a set of motion detection units, which comprise a rate detection assembly 225, an optical sensor array 230, and a set of accelerometers 235. The magnetic field is generated via a planar coil 220, which is controlled by the processor unit 205 via a coil interface 215. The rate at which the magnetic field changes polarity to encode the user data depends on the rate of relative movement detected by the rate detector. The multi-function electronic device 201a further comprises a real-time clock 240, a touch-sensor array 245, and a display 250, each operatively coupled to the processor unit 205. A user input may be made via the touch sensor array 245, which may comprise a touch screen panel, a keypad, or a combination thereof. The display 250 is able to display an alphanumeric sequence, as well as graphical icons (such as a logo for a bank, or other images). See, for example, FIGS. 8A and 11. Further, an optional backup power source 255 is depicted.

In one embodiment, the processor unit 205 is connected to the planar coil 220 and the motion detection units, via the motion detection module 210. The processor unit 205 is responsible for determining the appropriate rate with which to output data from the planar coil 220, wherein output data is encoded using alternating polarity of a generated magnetic field. The rate of the alternating polarity of the magnetic field is generated in accordance with the detected movement speed with which the card is swiped through the reader, in order for the reader to receive the encoded data at the appropriate rate. Magnetic card readers, which are designed to read conventional credit cards, are constructed to read data at specified input rates that correspond with the data density present in conventional magnetic card strips. The magnetic data symbols generated by the planar coil 220 are produced to align with the rate at which data is being read by the magnetic card reader. Accordingly, it is irrelevant if the multi-function electronic device 201a of the present disclosure is being swiped quickly or slowly, the planar coil 220 is controlled by the processor unit 205 to produce data at a substantially optimized rate, where the rate of data production is dependent on the rate at which the multi-function electronic device 201a is detected to be passing across the magnetic reader head.

Figure 9:
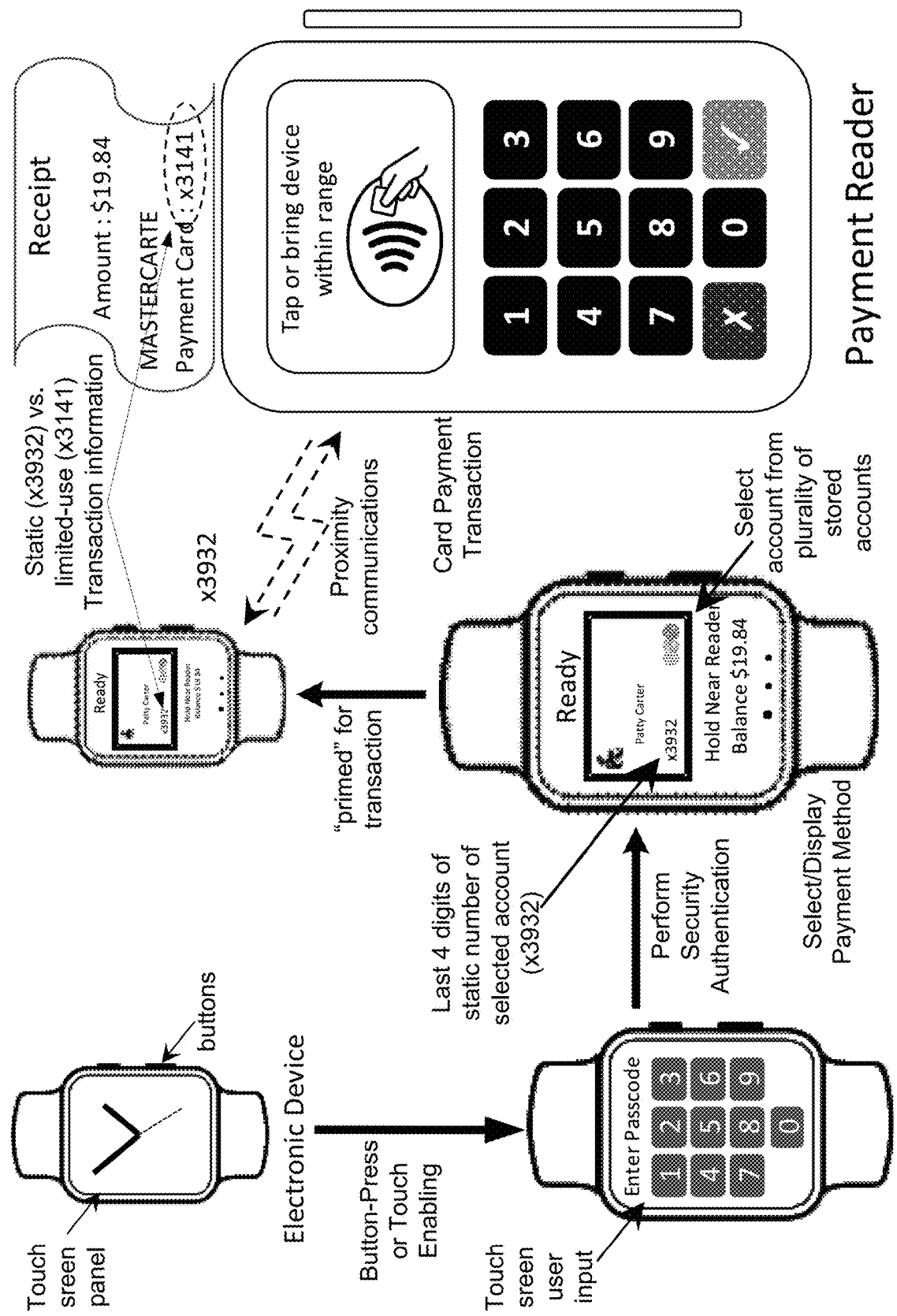
FIG. 9 illustrates an exemplary process of performing a financial transaction with a portable electronic device in conjunction with a payment reader, in accordance with embodiments of the present invention.

FIG. 2B depicts a multi-function electronic device 201b according to an embodiment of the present disclosure. Device 201b comprises a processor 205 and a memory unit 207, the processor 205 operatively coupled to the components of multi-function electronic device 201b. The memory 207 comprises a plurality of accounts 209, which may be credit card accounts, banking accounts, merchant accounts, online accounts, cryptocurrency accounts, and combinations thereof. A motion detection module 210 is coupled to the processor unit 205 and to a set of motion detection units, which comprise a rate detection assembly 225, an optical sensor array 230, and a set of accelerometers 235. Additionally, a galvanic sensor 275 is coupled to processor unit 205. The magnetic field is generated via a planar coil 220, which is controlled by the processor unit 205 via a coil interface 215. The rate at which the magnetic field changes polarity to encode the user data depends on the rate of relative movement detected by the rate detector. The multi-function electronic device 201b further comprises a real-time clock 240, a touch-sensor array 245, and a display 250, each operatively coupled to the processor unit 205. A user input may be made via the touch sensor array 245, which may comprise a touch screen panel, a keypad, or a combination thereof. See also, for example, FIGS. 8 and 9. The display 250 is able to display an alphanumeric sequence, as well as graphical icons (such as a logo for a bank, or other images). Further, an optional backup power source 255 is depicted. Multi-function electronic device 201b further comprises a near-field communication (NFC) unit 260, as well as a radio frequency identification (RFID) unit 265, both of which are operatively coupled to the processor unit 205. In one embodiment the NFC and RFID may share the planar coil for use as a RF antennae, through the coil interface 215. In one embodiment one or both the NFC and the RFID may have antennae dedicated to that individual sub-system. A universal serial bus (USB) connector 270 is coupled to the processor unit 205. The functionality of the components with regard to exemplary uses of multi-function electronic devices 201a and 201b is described in greater detail in the following description.

A further aspect of the present disclosure provides a single multi-function electronic device that can be used for multiple banks or financial institutions. For example, instead of carrying a separate credit card for each account of a variety of credit card companies, a customer need only to carry a single card according to embodiments of the present disclosure. The capability of the multi-function electronic device to generate a multitude of credit card numbers provides the ability of the multi-function electronic device to be associated with multiple accounts. Furthermore, inputs at the touch sensor array on the multi-function electronic device can be used to select the appropriate bank or credit provider account stored in the memory unit of the multi-function electronic device.

Figure 2C:
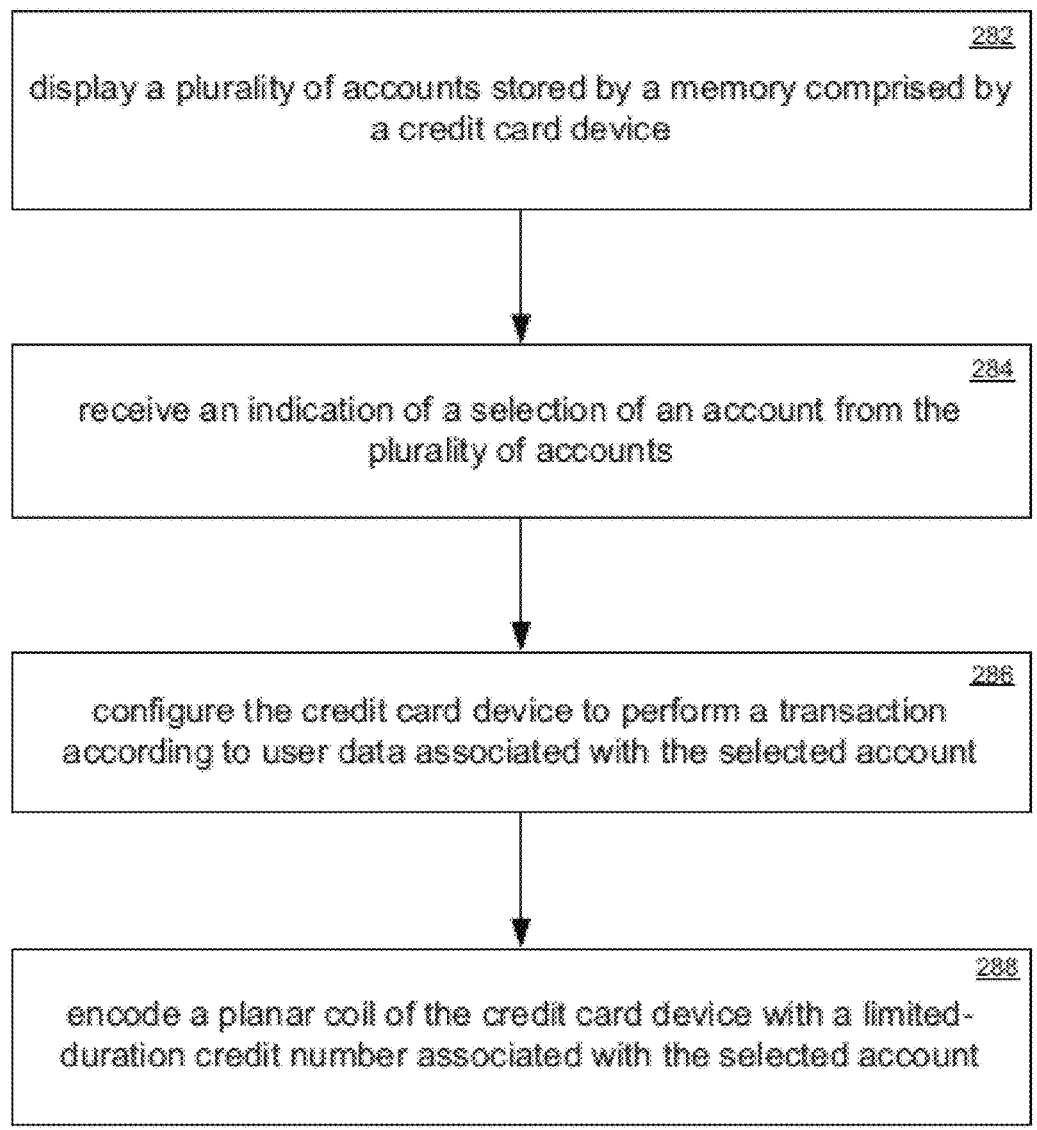
FIG. 2C depicts an exemplary process of selecting an account from a plurality of stored accounts according to an embodiment of the present disclosure.

FIG. 2C depicts a process of selecting an account from a plurality of stored accounts in order to perform a transaction with the selected account, according to an embodiment of the present disclosure. The process 280 begins at step 282, where a plurality of accounts stored by the multi-function electronic device memory is displayed. The plurality of accounts 209 are stored by memory 207, and are displayed using display 250. A user indicates an account selected from the plurality of accounts at step 284. The selection is able to be made by keypad or touch sensor array 245, and an indication of the selected account can be displayed via display 250. At step 286 the multi-function electronic device is configured according to account information associated with the selected account, which may include an account number, an expiration date, and other user information associated with the account (e.g. a username, PIN, password, email address, etc.). At step 288 the planar coil of the multi-function electronic device is encoded with a limited-duration credit card number that is associated with the selected account. The limited-duration credit card number is able to be generated according to the selected account, a timestamp, a transaction amount, an indicated merchant, user key or secrets, on-card unique hardware secrets, credit card authority key or secrets, user input from the card interface, and other information associated with the transaction.

Movement Rate Feedback

The relative movement rate of multi-function electronic device 201a is detected by one or more of the set of motion detection units, comprising the rate detection assembly 225, the optical sensor array 230, and the set of accelerometers 235. Each of the motion detection units detects the motion of the credit card 201a in a distinct manner. The rate detection assembly 225, which is positioned alongside (but independent of) the planar coil 220, is able to detect the location of a magnetic head reader as the rate detection assembly 220 is being passed through the credit card reader. The reader module of a conventional credit card reader comprises a metal head having a small gap at the tip of the head. A pickup armature resides in this gap, such that as the metal head passes over a credit card strip, an electric field is induced in the head reader pickup circuit. In one embodiment the rate detection assembly 225 is constructed of an array of auxiliary inductor coils and magnetic pickup coils. As the metal head of the card reader assembly passes over the arrangement of auxiliary inductor coils and magnetic pickup coils of the rate detection assembly 225, a disturbance in the magnetic field flowing between the two is induced, generating a change in current and producing a detected movement signal. The change in current is detected by the motion detection module 210, and is used to determine the rate of motion of the card reader head passing across the surface of the multi-function electronic device 201a (and therefore along the planar coil 220).

The optical sensor array 230 is also operable to detect a movement rate of the multi-function electronic device 201a with respect to a conventional magnetic card reader. The optical sensor array 230 is disposed nearby the planar coil 220, in order to accurately detect a movement rate in the region of the planar coil 220. In an embodiment, the optical sensor array 230 is a thin strip parallel to, and extending along, the length of the planar coil 220. The optical sensor array 230 determines a location of a minimum of received light, which corresponds to the region of a surface in nearest proximity to the optical sensor array 230. The magnetic reader head of a conventional magnetic card reader extends furthest from the surface of the card reader, and therefore the detected minimum in received light at the optical sensor array 230 corresponds with the location of the reader head. By tracking over time the position of this minimum received light along the optical sensor array, a detected movement rate may be found.

The set of accelerometers 235 are also operable to detect a movement rate of the multi-function electronic device 201a. The set of accelerometers 235 are positioned in the multi-function electronic device 201a in order to effectively measure the position and acceleration of the multi-function electronic device 201a. In an embodiment, the set of accelerometers comprises groups of accelerometers, each group having one or more accelerometers disposed at orthogonal planes to each other, and each group capable of generating signals that allow for determination of the orientation, motion and acceleration of the multi-function electronic device 201a.

The detected movement signal is received by the motion detection module 210. The detected movement signal is generated by any one of the set of motion detection units, or any combination of motion detection units of the set. For example, the movement detection signal is able to be generated by the combination of the rate detection assembly 225 and the optical sensor array 230. In an embodiment, the movement detection module 210 is able to determine the movement rate of the multi-function electronic device 201a from the detected movement signals, and transmits the determined movement rate, and orientation to the processor unit 205. In an embodiment, the motion detection module 210 sends the detected movement signal to the processor unit 205, and the processor unit 205 determines the relative movement rate.

In one embodiment, the generation of the magnetic field by the planar coil 220 at a specified rate of alternating polarity is accomplished according to the following description. One or more of the motion detection units in the set of motion detection units (rate detection assembly 225, optical sensor array 230, and set of accelerometers 235) detect a movement rate of the multi-function electronic device 201a with respect to a magnetic card reader, and signal the motion detection module 210. The movement rate is provided to the processor unit 205, which determines the appropriate rate for alternating the polarity of the magnetic field generated by the planar coil 220. The processor unit 205 outputs instructions or data to the coil interface 215 at the determined rate, which in an embodiment is a digital-to-analog converter (a DAC) and acts to translate the signal from digital to analog in order to drive the planar coil 220 and produce the magnetic field. The instructions from the processor unit 205 are comprise binary code, which are output through a shift register to the coil interface 215. The shift register outputs data at a rate proportional to the determined movement rate of the multi-function electronic device 201a—thus, a higher determined multi-function electronic device 201a movement rate has a corresponding higher output rate at the shift register, leading to a higher rate of alternating polarity at the generated magnetic field (i.e., encoded data symbols output more quickly). Conversely, a lower movement rate of multi-function electronic device 201a leads the processor unit 205 to control the shift register to output data at a lower rate, and consequently the rate of alternating polarity in the generated magnetic field is lower.

Figure 3:
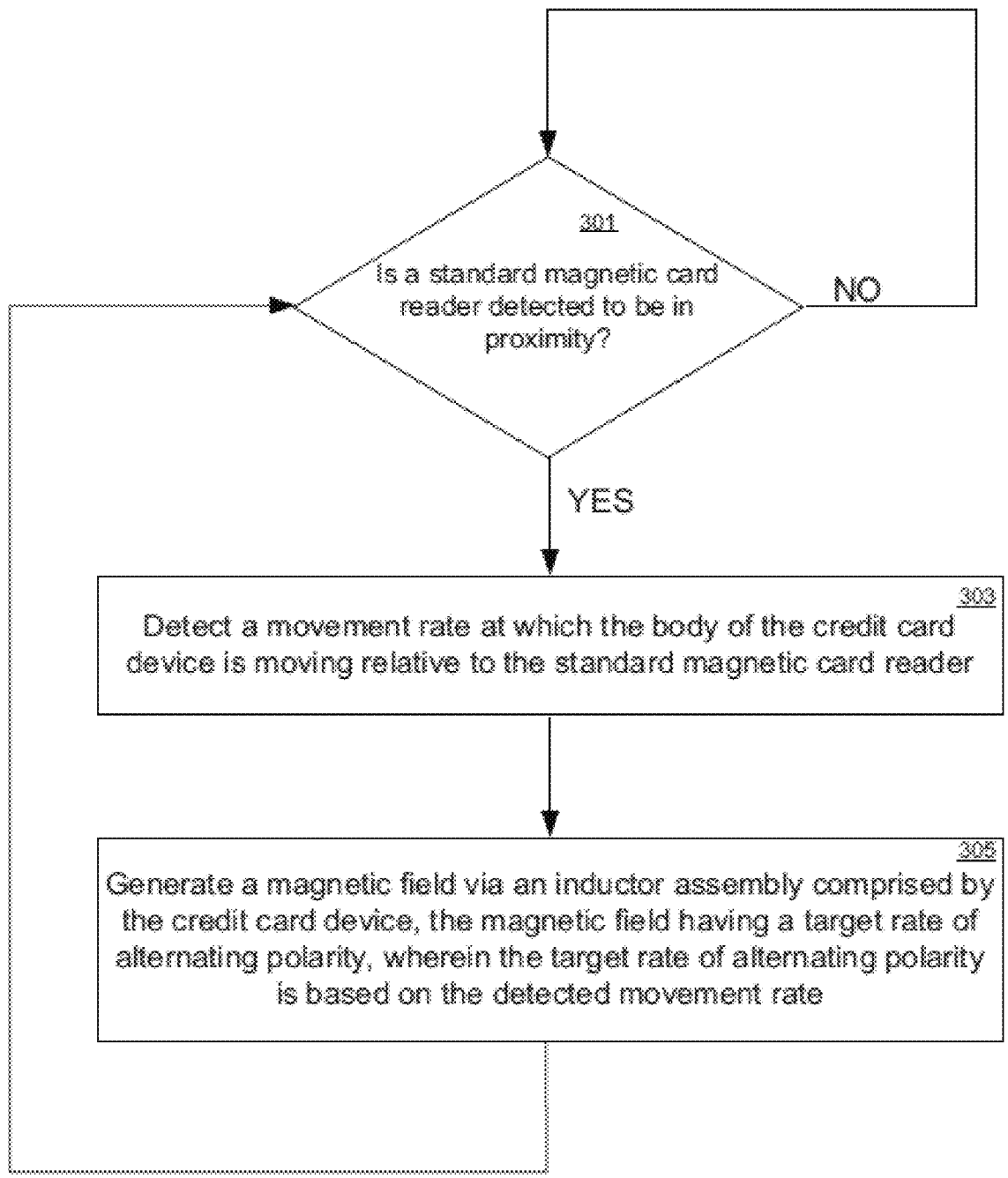
FIG. 3 is a flowchart illustrating an exemplary process of generating a magnetic field with an alternating polarity according to an embodiment of the present disclosure.

FIG. 3 illustrates an exemplary process 300 for determining the rate to alternate the polarity of the generated magnetic field of the multi-function electronic device, according to an embodiment of the present disclosure. At step 301 the process determines if a standard magnetic card reader is detected to be in proximity with the multi-function electronic device. If NO, the step repeats. If YES, the process moves to step 303. At step 303 a detection of a movement rate at which the body of the multi-function electronic device is moving relative to the standard magnetic card reader is made. The process continues at step 305, wherein a magnetic field is generated by an inductor assembly comprised by the multi-function electronic device, the magnetic field having a target rate of alternating polarity that is based on the detected movement rate from step 303. The process then repeats at step 301, determining if a standard magnetic card reader is (or remains) in proximity to the multi-function electronic device. In this manner, while a standard magnetic card reader is detected to be in proximity to the multi-function electronic device, the movement rate of the multi-function electronic device is determined and the polarity and orientation of the generated magnetic field is alternated at the appropriate rate, to recreate the data as described above, at the correct rate, in order to clock out the data to be conveyed to the magnetic strip reader, at a rate matching the action of an ordinary magnetic strip card through same the magnetic card reader.

Security

Security is an area of concern for credit card holders, as the small form factor makes theft quite easy, and additionally there are many ways for a malicious third-p arty to record the account number of a credit card in order to later make fraudulent transactions on the account. Embodiments of the present disclosure address security concerns of a credit card owner on several fronts.

Figure 4A:
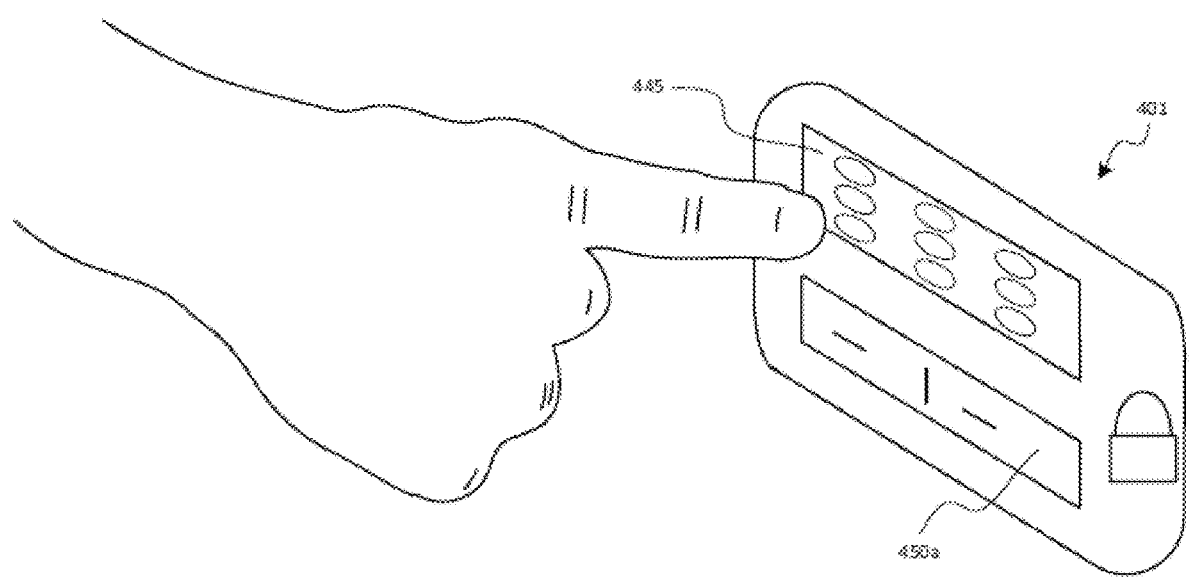
FIGS. 4A-4B illustrate a user interacting with a touch sensor of the multi-function electronic device, according to an embodiment of the present disclosure.
Figure 4B:
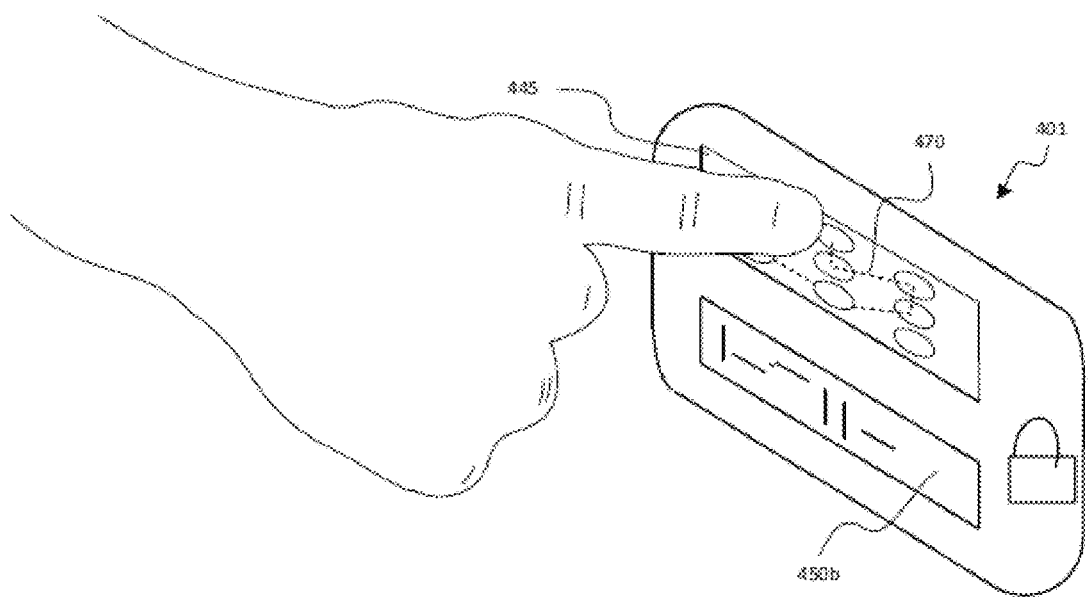

In one aspect, security of the multi-function electronic device is enhanced by providing a means of locking the multi-function electronic device in order to prevent use, until such time that a valid user input is entered. Embodiments of the present disclosure provide a multi-function electronic device having a region for receiving human input, e.g., touch sensors which are able to be formed by contacts that a user can press (e.g., the touch sensor array 245 of FIGS. 2A-2B). FIGS. 4A-4B illustrate a user interacting with a multi-function electronic device 401 via a keypad or touch sensor array 445. In FIG. 4A, the multi-function electronic device 401 is in a locked state. A display 450 is able to display a message to the user, for instance, the message "device locked" or "enter password," or question prompts which guide the user to respond with answers through the key-pad or the touch sensor, to certain preset questions, that confirm personal knowledge known only to the associated user. The touch sensor array 445 enables user interaction with the multi-function electronic device 401. An exemplary use of the touch sensor array 445 is an input of a currency amount to be used in a transaction. The touch sensor array 445 is able to include buttons, or a touch-sensitive pad, or a combination of the two. Other embodiments of the touch sensor array 445 allowing a user to input data to the multi-function electronic device 401 are consistent with the spirit and scope of the present disclosure.

In order to unlock the multi-function electronic device 401 and enable a transaction or other usage, the user inputs data via the touch sensor array 445. FIG. 4B illustrates the user inputting a password via a gesture 470, which operates to unlock the multi-function electronic device 401. The display 450b is able to display a message indicating the multi-function electronic device 401 is unlocked and ready for use, for instance, display 450b may display the message "unlocked," or it may display an account number associated with the multi-function electronic device 401.

Embodiments of the present disclosure provide additional functionality for the touch sensor array 445. For example, there may be touch contact terminals that a user can press to wake up the multi-function electronic device 401, to cause the battery to supply power, or to place the multi-function electronic device 401 in a power reduction mode when it is not being used. In an embodiment, if any number other than the correct password is entered multiple times, or if there is an attempted usage of the multi-function electronic device 401 without entering in a password, an automatic phone call may be triggered to the appropriate fraud protection authorities.

In one embodiment of the present disclosure, the display 450 is a thin-film liquid crystal display ("LCD"). The display 450 is able to have multiple uses. In one embodiment, the display 450 can be used to cue the user for a security question upon input of an improper password. Or if fraud protection services need to contact a customer, they can verify the customer's identity by transmitting a security question to the display 450 of user's multi-function electronic device 401, to which the user would need to respond correctly using the input buttons of touch sensor 445 on the card. See also, for example, FIGS. 8 and 9.

Limited-Duration Credit Card Number

A further security feature of the multi-function electronic device provided in the present disclosure is the capability of producing a limited-duration credit card number for performing transactions using accounts of the card. The multi-function electronic device comprises a real-time clock that is able to produce a cryptographically protected timestamp for each interaction. The power source is able to activate the processor unit such that a unique number may be generated by the multi-function electronic device and verified by the credit authority according to the timestamp and the transmitted user information. The limited-duration credit card number is able to be produced at the time the multi-function electronic device is performing a transaction, and is able to be generated according to the user's private information, a bank information, information regarding the facility performing the transaction, and the time of day. The limited-duration credit card number is able to be limited to only one transaction, a finite number of transactions, or may be limited to a specified period of time—e.g., 2 minutes, 10 minutes, 3 hours—after which time that particular limited-duration number would become invalid. As detailed above, if an expired limited-duration credit card is attempted to be used for a transaction, the transaction is denied and an automatic notification is able to be made to a credit authority in order to notify the user and to prevent transactions on the account. The transaction count is able to be determined through the action of passing the card through magnetic reader, and the process of transmitting the card number to the card reader.

In one embodiment, the number on the front of the card is able to be a full or partial number. In an embodiment, the number displayed on the multi-function electronic device is a static number, but the number transmitted during a transaction is a limited-duration credit card number as described above. The number displayed on the multi-function electronic device may not necessarily be a static number. For example, the first four and last four digits of the credit card number are able to be fixed, while the remaining eight digits can be dynamically generated. As the credit card is read by the machine, part or all of the number may be dynamically produced at the time the card is read. As described above, the dynamic part of the limited-duration credit card number generated may be based on the user's private information, the user's bank information, the time of day, or the facility that is reading the card. Further, the expiration date of the multi-function electronic device can also be dynamically generated. See also, for example, FIGS. 8, 9 and 11.

Figure 11:
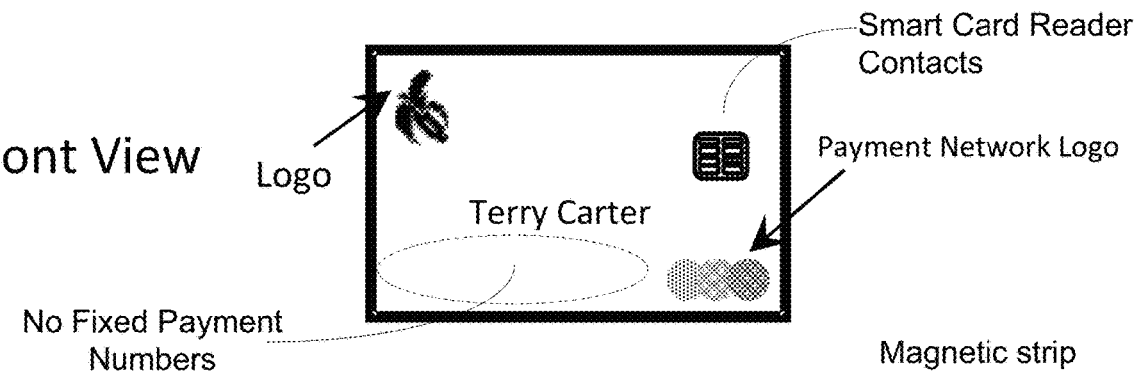
FIG. 11 illustrate an exemplary electronic credit-card-like multi-function electronic device that has no fixed payment information, in accordance with embodiments of the present invention.
Figure 11:
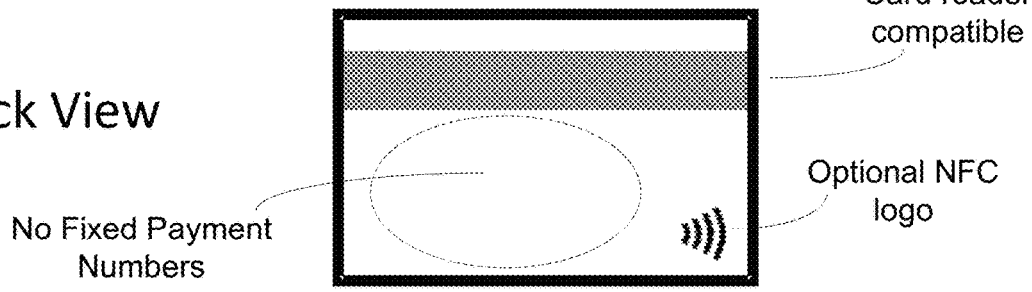
Figure 12:
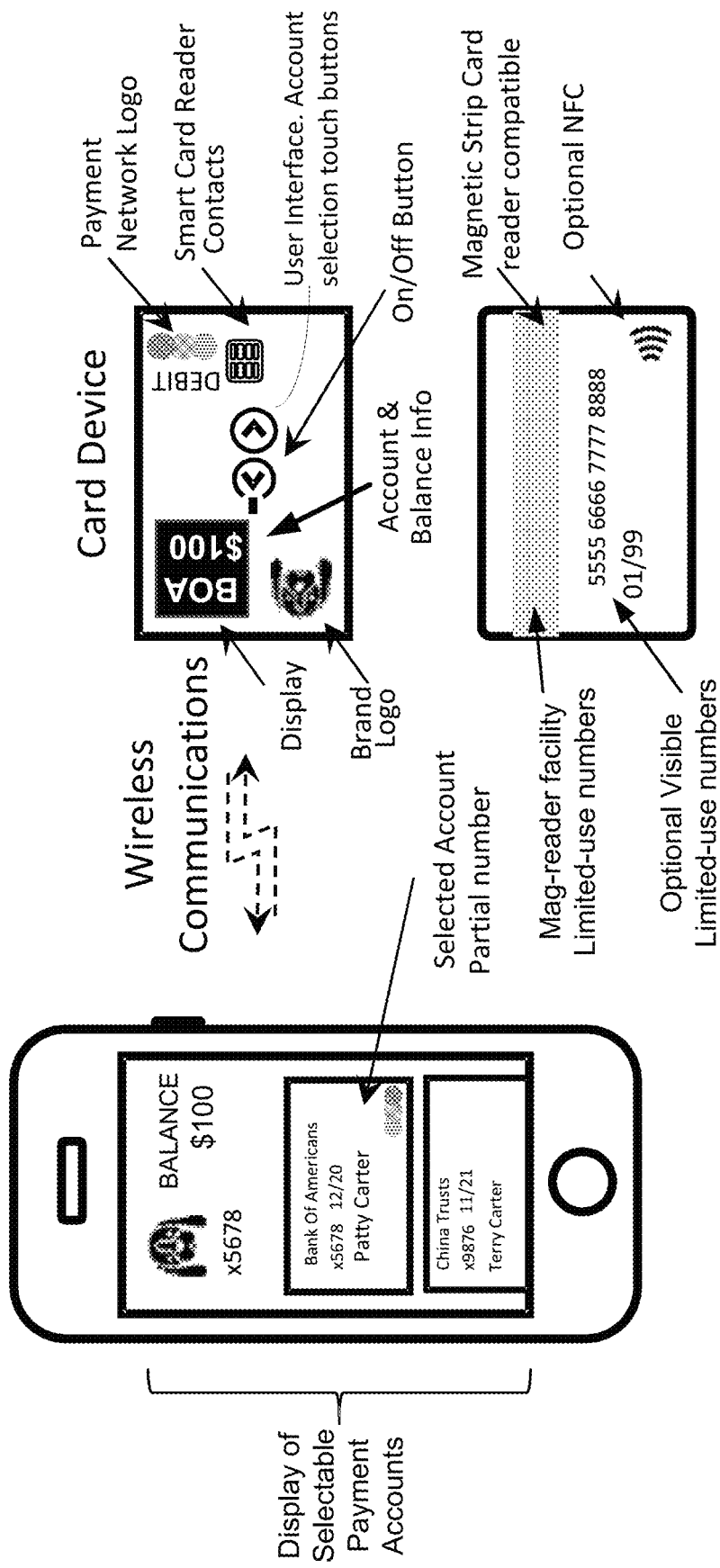
FIG. 12 illustrates an exemplary process for user selection of a preferred payment account for an electronic credit card-like device, in accordance with embodiments of the present invention.

Effectively, embodiments of the present disclosure provide a multi-function electronic device that has no fixed number, as illustrated in FIG. 11, and therefore the account cannot be compromised. Only the number generated at the instant of the credit card transaction matters. Accordingly, unauthorized use of the multi-function electronic device is highly unlikely, because a transaction cannot be conducted with an expired limited-duration credit card number, or only the static portion of the credit card number. In one embodiment of the present disclosure, sufficient dynamically generated numbers are provided for on the credit card such that a unique credit card number can be generated for each transaction. In this embodiment, the credit card of the present disclosure effectively acts as a unique per-transaction credit card.

With reference to FIG. 2A, 2B, in one embodiment, the process steps enabling a card transaction are as follows. A multi-function electronic device (e.g., multi-function electronic device 201b) is connected to a computer system (e.g. computer system 590, FIG. 5), via any of the connection means available to the multi-function electronic device (USB 270, NFC 260, and RFID 265). User data and other essential information, such as account information, are downloaded to the multi-function electronic device. For example, for an account designed for online transactions, user account information will likely include an account email and an account password. The account may be for example a bank account, a credit account, a merchant account, an online transaction account, or a cryptocurrency. In one embodiment a currency amount is also downloaded, which is made accessible to the multi-function electronic device 201b for transactions. In an alternative embodiment, rather than a currency amount being downloaded to the multi-function electronic device 201b, the user account information (e.g., username and password) is stored such that a subsequent authorized multi-function electronic device 201b transaction is automatically pre-authorized to deduct (or credit) the entered transaction amount at a stored account. In an embodiment, a user uses the touch sensor array 245 of the multi-function electronic device 201b in order to input the user information, including the amount of currency to be stored. The information entered by the user is able to include an account source of a transaction (e.g., bank account, credit account, merchant account, ATM, online payment service, or a cryptocurrency), as well as a type of transaction to be made (e.g., as a debit card, as a credit card, or as a user account). In another embodiment, the information is entered using the computing system to which the multi-function electronic device 201b is connected.

Transactions may be authenticated on the specified account by entry of the username and password for the account during the transaction, using the touch sensor array 245. In an embodiment, a password for an account is represented by a user input (such as a gesture, a swipe, and/or an unlock keycode) which is entered on multi-function electronic device 201b during a transaction for account authentication. See also, for example, FIG. 9. According to an embodiment of the present disclosure, a user that has "primed" the multi-function electronic device 201b for a transaction has already performed a security authentication on the card, and therefore a subsequent card transaction is able to be pre-authorized to perform the transaction without further user authentication steps. The priming action can be a tap of the multi-function electronic device 201b detected by accelerometers 235, or a gesture, swipe, or a key input received by touch sensor array 245. See also, for example, FIG. 9.

A transaction is able to be communicated using the planar coil 220. In one embodiment, when the transaction is a credit card transaction, a limited-duration credit card number is generated. A user inputs an amount for the transaction using the touch sensor array 245, and the limited-duration credit card number is generated to correspond with the entered amount. The binary data corresponding to this limited-duration credit card number is sent from the processor unit 205 to the coil interface 215, where it is converted to an analog signal in order to drive the planar coil 220 to generate a magnetic field having an alternating polarity corresponding to the encoded data of the limited-duration credit card number.

Online Transactions

Figure 5:
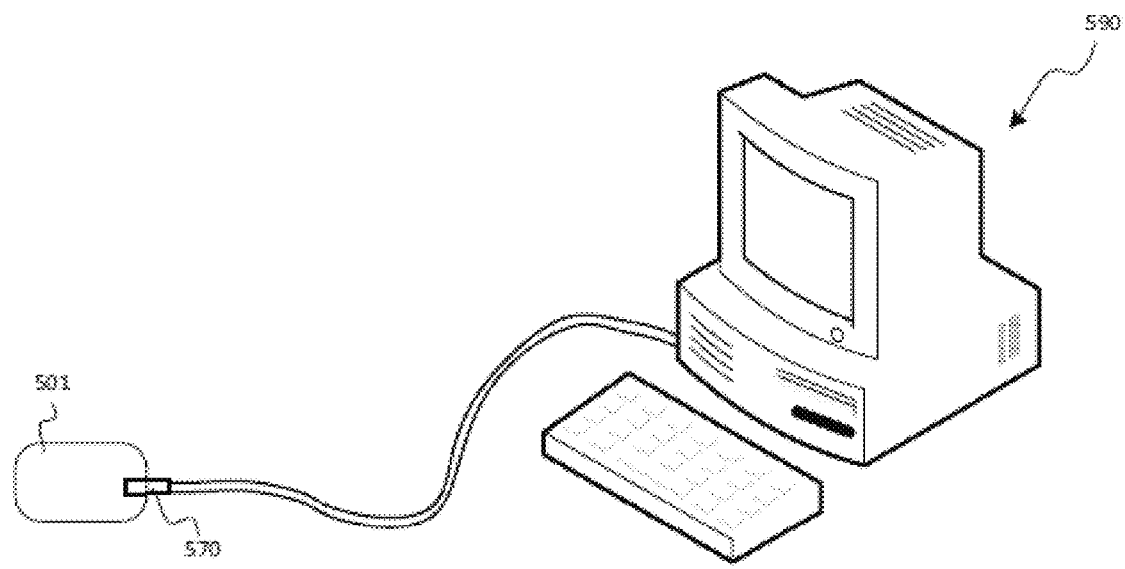
FIG. 5 is an illustration of a multi-function electronic device connected with a computing system and operating according to an embodiment of the present disclosure.
Figure 10:
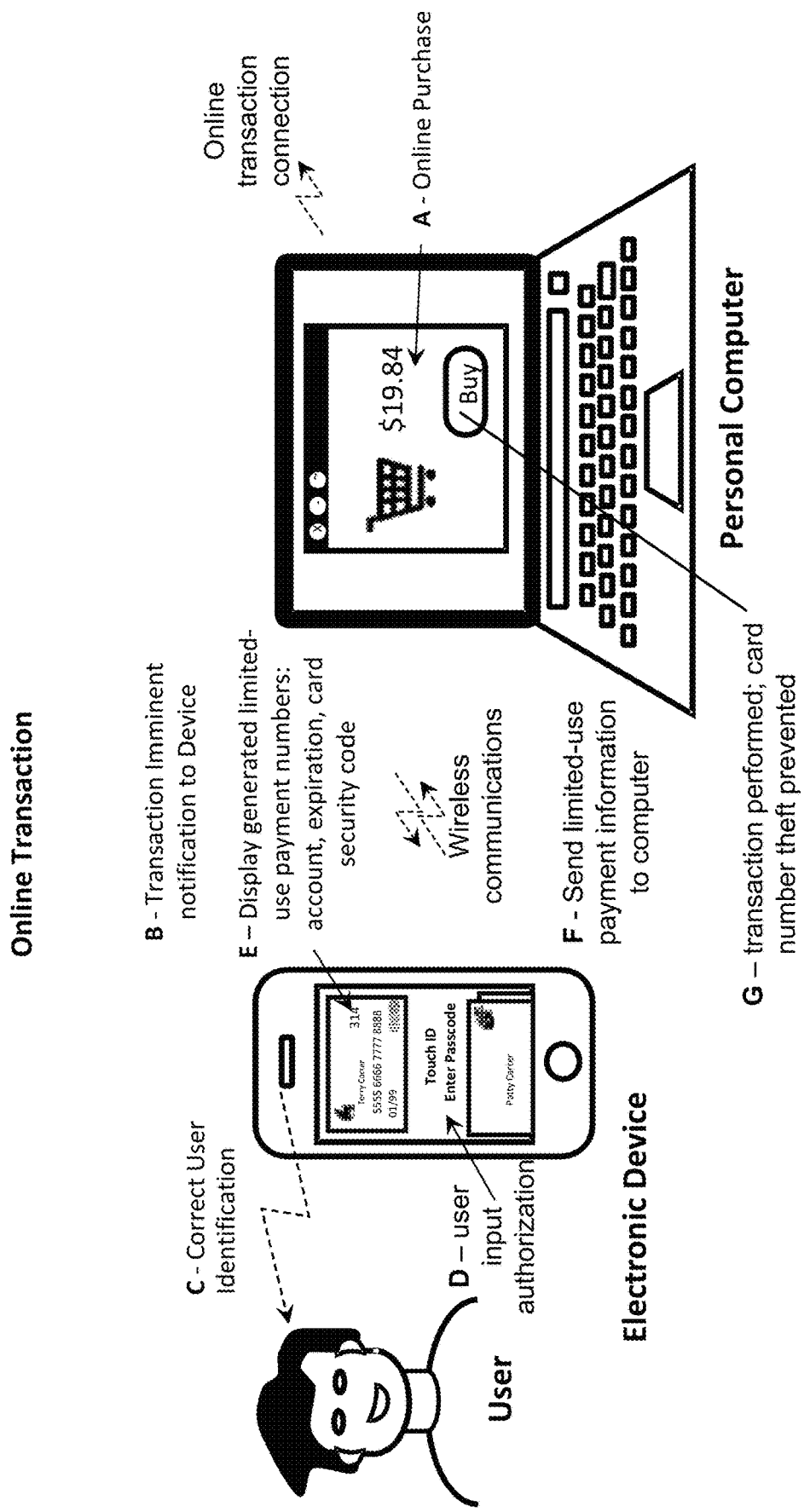
FIG. 10 illustrates an exemplary process for performing a financial transaction with a portable electronic device in conjunction with a personal computer, in accordance with embodiments of the present invention.

FIG. 5 displays the multi-function electronic device 501 in connection with a computing device 590. In one embodiment, the multi-function electronic device 501 is able to be used to make online purchases. In one embodiment, the multi-function electronic device 501 is equipped with a means 570 for communicating with the USB port on a computer or other device in order to make online purchases. In one embodiment the multi-function electronic device 501 may have an area cut-out, such that contact terminals corresponding to a USB cable connector are contained within, enabling connection of a USB cable (e.g., a micro- USB connection). When performing online transactions, the multi-function electronic device 501 can uniquely generate a limited-duration credit card number (as described above) for online purchases. The multi-function electronic device 501 receives a user input indicating that a transaction is imminent, and an authorization. The user input is able to comprise a gesture, a swipe, a key input sequence, and combinations thereof. The limited-duration credit card number is able to be displayed on the front display of the multi-function electronic device 501. In one embodiment, the multi-function electronic device 501 is able to use RFID 265 or near field communication NFC 260 technology in order to connect to a personal computer 590. This enables a per-transaction, limited-use credit card number, enhancing the security of the credit account by substantially negating the possibility of a theft of the credit card number used to perform the transaction leading to account compromise. See also, for example, FIG. 10.

According to an embodiment, the transaction is able to include information regarding a user account, such as an email address of the user, and upon reconnection of multi-function electronic device 201b to a computer system (for instance, computer system 590), the transaction information stored on multi-function electronic device 201b could be "replayed" by the computer system in order to finalize the transaction.

In one embodiment, a means of limiting an available credit amount are provided. According to the download process described above, the multi-function electronic device is able to have a total credit available. The multi-function electronic device is able to reference the total credit available in subsequent transactions, and will provide limited-duration credit card numbers corresponding to amounts up to, but not exceeding, the remaining credit available to the multi-function electronic device. An attempt to perform a transaction having an amount exceeding the remaining credit available will not result in a valid limited-duration credit card number, and therefore an authenticated transaction cannot proceed. In general, the multi-function electronic device will only successfully generate a limited-duration credit card number if the proper conditions for a transaction are determined to be present. The proper conditions for a transaction comprise a correct identification having been made by the user (via a gesture, swipe, and/or key input) and an amount for the transaction indicated to be less than the total credit available to the account indicated for the transaction.

Card-to-Device Transactions

In addition to transactions performed using conventional magnetic card readers (such as at point-of-sale locations, banks, and automated teller machines (ATMs)) and via cable connection with a computing device, transactions performed wirelessly between a card and a device (e.g., card-to-card, card-to-computer device having a reader dongle, card-to-ATM) are provided according to embodiments of the present disclosure. See, for example, FIGS. 8 and 10. For simplicity, the following describes a card-to-card transaction, but it will be understood that card-to-device transactions are similarly provided.

Figure 6:
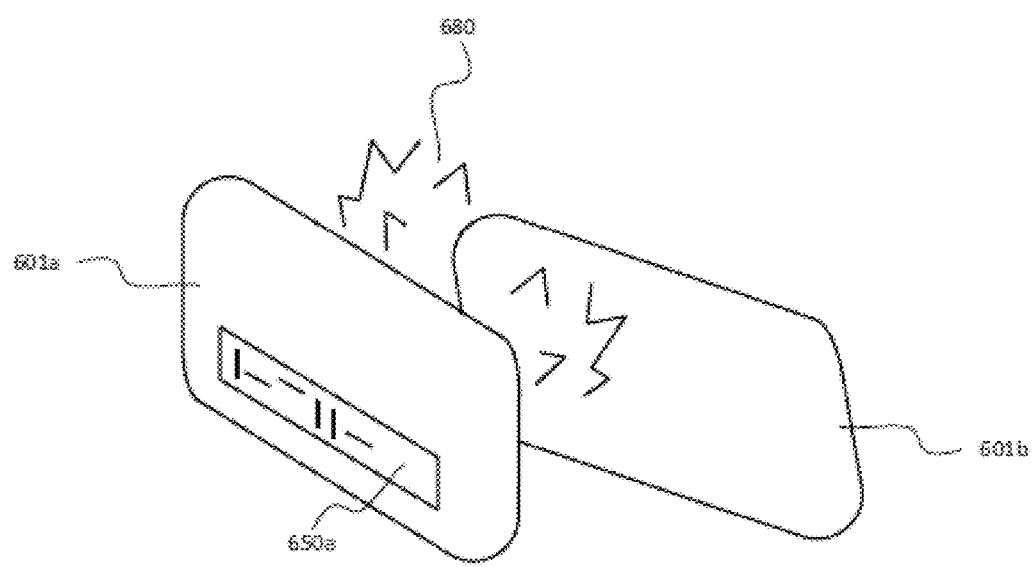
FIG. 6 is an illustration of two multi-function electronic devices performing a transaction according to an embodiment of the present disclosure.

FIG. 6 illustrates a card-to-card transaction according to one embodiment. A first multi-function electronic device 601a comprises a display 650a, and is in contact with a second multi-function electronic device 601b. A contact interaction between the cards is indicated by interaction 680. In one embodiment, the contact interaction is a tapping of multi-function electronic device 601a against multi-function electronic device 601b. In another embodiment, an optical sensor array at one or both of the cards detects interaction 680. In another embodiment, interaction 680 indicates a swipe of multi-function electronic device 601a across multi-function electronic device 601b. In one embodiment a user input through the key-pad initiates and enables a transaction from first card to second card. In one embodiment the presence of second card in preparation for card to card transaction is confirmed through "polling," the process of which involves transmission of data between cards, and confirmed receipt of transmitted data by response received from second card received at first card, including information confirming receipt of the information, by second card.

The planar coil comprised by each of multi-function electronic device 601a and multi-function electronic device 601b is able to be a means of transferring information for a transaction, e.g., such as an antenna. Once either, or both, of multi-function electronic device 601a and multi-function electronic device 601b detect interaction 680, a transaction is able to be completed via generation of a magnetic field at one card and reception of the magnetic field (i.e., reading) at the other card. In this manner, the card (e.g., multi-function electronic device 601a) receiving the transaction information operates its planar coil in an antenna mode. This enables multi-function electronic device 601a and multi-function electronic device 601b to authentically perform a transaction, and to transfer a currency between multi-function electronic device 601a and multi-function electronic device 601b. As described above, in an embodiment the transaction is able to use a limited-duration card number to encode the transaction.

In an embodiment, a set of accelerometers is used to detect the beginning of the transaction, for instance, a transaction performed by a swipe of multi-function electronic device 601a across multi-function electronic device 601b. Further, the set of accelerometers can detect a "priming" action for a multi-function electronic device, i.e., an indication for a multi-function electronic device that a transaction is imminent. The priming action can be a tap of the multi-function electronic device 601a, or tapping the multi-function electronic device 601a against the multi-function electronic device 601b. In one embodiment, a touch sensor array is able to be used for the priming action.

In an embodiment of a card-to-card transaction, one card (e.g. 601a, the card of the user having a currency debit) generates the limited-duration credit card number, which is transmitted via the card's planar coil. The multi-function electronic device of the recipient (e.g., 601b, the card of the user receiving a currency credit) receives the encoded data via the planar coil, acting as an antenna, and the coil interface is able to convert the received signal into a digital signal understood by the processor to be the limited-duration credit card number, identifying both the correct account and the amount of the transaction.

In one embodiment, the multi-function electronic device 201b stores cryptocurrency information in processor unit 205. The cryptocurrency information stored is able to include a plurality of cryptocurrency addresses, a plurality of private keys, and a plurality of public keys. The multi-function electronic device 201b is able to perform a transaction, as described above, using a cryptocurrency as the specified account. In one embodiment, the multi-function electronic device 201b is able to hash a portion of the transaction, using the processor unit 205 and the real-time clock 240 along with user information pertinent to the cryptocurrency account and the transaction. A subsequent connection of the credit card 201b to a computing device provides a means of connecting to the cryptocurrency servers and finalizing the transaction. Further, the multi-function electronic device 201b is able to sign a cryptocurrency transaction by, for instance, receiving a prompt at the display 250 to input a dynamic PIN specific to the transaction, which is able to be entered by touch sensor array 245.

In a card-to-card cryptocurrency exchange, a record of the transaction can be made according to the following. A first card (e.g. 601a) making a deduction with an amount indicated via touch sensor array 245 is able to generate a record of the transaction and store the record in the card memory, while a second card (e.g. 601b) receiving the cryptocurrency is able to generate a confirmation of the received transaction amount. In one embodiment, the amount indicated is provided by the receiving card 601b. The hashed record of the transaction contains the unique information of each user, along with the transaction amount. The success or failure of the transaction is able to be displayed on the respective displays of credit cards 601a and 601b.

Account Theft and Unintended Use Prevention

A security concern for conventional credit cards utilizing wireless communication means is the ability of a thief to access and/or copy user information through un-detected interaction with the wireless communication means. Sensitive and confidential information can be gleaned via, for example, "listening-in" on an RFID interaction between a credit card and a contactless reader, recording the characteristics of the interaction, and replicating certain characteristics to fake an authorized transaction. While to a great extent security concerns are addressed by the usage of limited-duration credit card numbers and other security features provided for by the credit card of the present disclosure and previously described, a further security feature regarding the wireless communication means of the multi-function electronic device is described herein.

In one embodiment, wireless communication means of the multi-function electronic device 201b are in a powered-down, or disabled, state prior to receiving an authenticated activation signal from a user. Upon receiving the activation signal, the communication means (e.g., NFC 260, RFID 265, and planar coil 220) are activated, enabling the multi-function electronic device 201b to conduct a transaction. The activation signal can originate from one (or a combination) of the set of motion detection units (rate detection 225, optical sensor array 230, and accelerometers 235), the touch sensor array 245, and the galvanic sensor 275. The galvanic sensor 275 is operable to detect a contact of human skin, via a current produced at the sensor 275 upon such contact. See also, for example, FIG. 8. In an embodiment the galvanic sensor 275 is comprised of metallic contacts disposed on opposite sides of, and isolated by, the body of multi-function electronic device 201b. In one embodiment, the current produced by user contact with the galvanic sensor 275 contacts is sufficient to provide small amounts of energy in order to power components of the card. For example, energy produced is able to power the processor unit 205 and the RFID 265. In one embodiment the galvanic sensor 275 further comprises two conducting surfaces separated by a junction, and the galvanic sensor 275 is configured as a thermoelectric generator (e.g., via the Peltier effect, the Seebeck effect, or a combination). For example, heat applied at one surface of the multi-function electronic device 201b may lead to differential heating between the opposing, separated conducting surfaces of the galvanic sensor 275, generating an electric current and powering a subset of, or all of, the components of multi-function electronic device 201b (e.g., the processor unit 205, the NFC 260, and the RFID 265).

In an embodiment, the communication means are activated only so long as the activation signal continues to be detected. In another embodiment, the communication means are activated for a specified amount of time following detection of the activation signal. For example, if using the multi-function electronic device 201b in an ATM (or other device) preventing continuous human contact, the activation signal is able to be a swipe, gesture, or key input sequence entered via the touch sensor array 245, which activates the card for a specified duration (for instance, one minute). In an embodiment the detection of motion through accelerometer input indicates activation by a valid user. In one embodiment the specific motion detected through accelerometer input corresponding with a specific user action, such as a "flick", "swipe", "spin", "wave", "tap," may be used to initiate activation, wherein the motion is not normally generated at idle and during periods of inactivity. For example the motion not being generated accidentally while the card is stored in a user's wallet, carried while the user is actively moving, or is being handed from user to a clerk at a point of transaction. In one embodiment the specific motion, or sequence of motions, may be associated with a user, and stored on the card memory, such that performing the correct sequence when prompted can confirm the possession of the card by the known owner, thus initiating activation and enabling usage.

Figure 7:
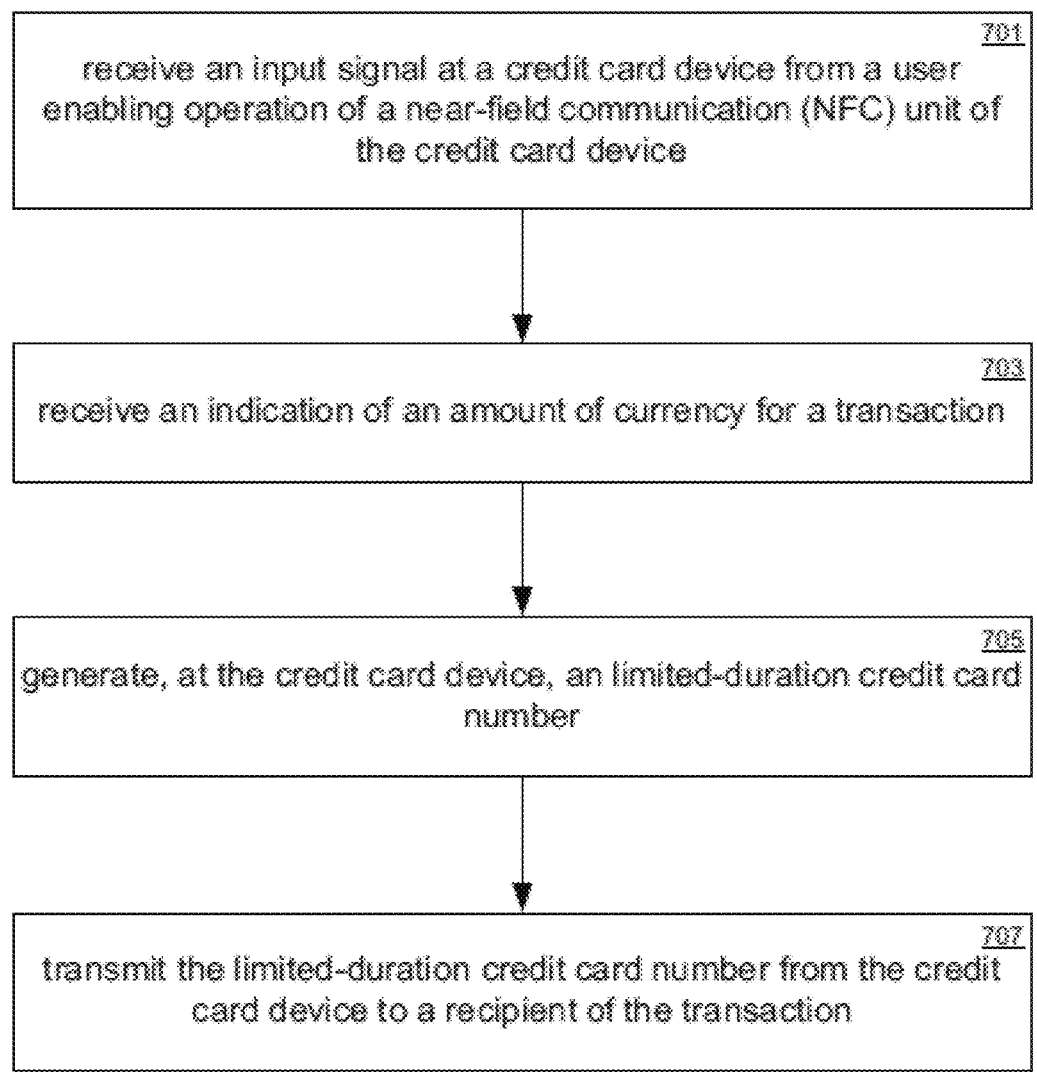
FIG. 7 depicts an exemplary process according to an embodiment of the present disclosure.

FIG. 7 depicts a process of selectively enabling the communication capability of the multi-function electronic device according to an embodiment of the present disclosure. The process 700 begins at step 701, where an input signal is received at the multi-function electronic device from a user. The input signal is able to be generated by any one, or combination, of a plurality of input means, where the input means comprise: a swipe gesture received at a touch sensor array; a key press sequence; an accelerometer sensor indication of multi-function electronic device motion; and a galvanic sensor indication that the credit card is in a user grasp. The input received from the user enables operation of a near-field communication (NFC) unit of the multi-function electronic device. In one embodiment, the NFC unit is disabled prior to receiving the input signal. In one embodiment, an RFID communication unit is disabled prior to receiving the input signal, and is activated by the input signal. In one embodiment, the planar coil is disabled prior to receiving the input signal, and is activated by the input signal.

The multi-function electronic device, following enablement of the NFC unit, receives an indication of an amount of currency for a transaction at step 703. At step 705, the multi-function electronic device generates a limited-duration credit card number, which at step 707 is transmitted to a recipient of the transaction. In one embodiment, the limited-duration credit card number has a limited recurrence, and is limited in scope of use to a predetermined number of authorized transactions.

In the foregoing description of process 700, the ordering of the process steps is exemplary and should not be construed as limiting. Alternative ordering of the process steps is consistent with the present disclosure, as conceived by one skilled in the relevant art.

In one embodiment of the present invention, a credit card comprises a dynamic magnetic strip incorporating a main inductor assembly from which magnetic field data symbols are dynamically generated. In one embodiment the inductor assembly may be a planar coil formed within the plastic that the credit card is composed with. The advantage of using a planar coil is that it can produce the same magnetic field interaction that a traditional magnetic strip on a conventional credit card can produce when it is passed through a reader. Similar to a traditional plastic credit card, the planar coil can also produce a magnetic field that can be read by a pickup (or "transducer"). The pickup produces electric current in the coil that, in turn, produces a magnetic field that is read by the pickup. Accordingly, the planar coil can be read in the same way as the magnetic strip on a traditional plastic credit card. The magnetic field produced by the planar coil would behave identically to a traditional magnetic strip.

In one embodiment, alongside the main planar coil, auxiliary rate detection assembly independent of the main inductor assembly would be provided to assist with the alignment of the production of data from the loop as it is being passed over the head of the credit card reader. The reader module of a traditional credit card reader comprises a metal head with a small gap on the tip of the head. This gap is where the pickup armature resides, so that when the metal head passes over the credit card strip, an electric field is induced in the head reader pickup circuit. In one embodiment the auxiliary rate detection assembly is constructed of an array of auxiliary inductor coils and magnetic pickup coils, alongside the main coil. As the metal head of the card reader assembly passes over the arrangement of auxiliary coils and pickup circuits, a disturbance in the magnetic field flowing between the two generates a electrical current change that is detected by a rate detection circuit so as to detect the rate of motion of the card reader head passing across the surface of the card and therefore along the main induction assembly. The purpose of this is to allow the determination of the rate or production of magnetic data symbols in the main inductor assembly to align with the rate at which data is being read by the reader, according to the data density of standard card magnetic strips. Accordingly, it is irrelevant if the credit card of the present invention is being swiped fast or slow, the main inductor assembly produces data at just the right rate depending on the rate at which the card is detected it is being passed over the reader's head.

In one embodiment, a microprocessor is connected to the main coil and the alignment pickups. The microprocessor is responsible for producing the data from the coil at the appropriate rate in accordance with the speed with which the card is swiped through the reader. As shown in FIG. 1, the auxiliary coil detects the rate at which the credit card is being swiped. The microprocessor then uses this information to produce the data from the main planar coil at the appropriate rate for the credit card reader.

In addition, the credit card of the present invention comprises a real time clock that can produce a cryptographically worthy timestamp for each interaction and a battery back up that can be used to power up the microprocessor. Further, the card can comprise additional human inputs, e.g., touch sensors which can be formed by contacts that a user can press. For example, there can be contacts that a user can press to wake up the card, to cause the battery to supply power, or to put the card to sleep when it is not being used. There can also be additional inputs to key in customer specific information. For example, there can be inputs to key in a password or any other kind of unique identifier. If any other number besides the password is entered multiple times, or if there is attempted usage of the card without entering in a password, an automatic phone call may be triggered to the appropriate fraud protection authorities.

In one embodiment, the number on the front of the card can be a full or partial number. The number may not have to necessarily be a static number. For example, the first four and last four digits of the card number can be fixed while the remaining eight can be dynamically generated. As the credit card is read by the machine, part or all of the number may be dynamically produced at the time the card is read. The dynamic part of the number generated may be based on the user's private information, the user's bank information, the time of day or the facility that is reading the card. Further, the expiration date of the card can also be dynamically generated. Effectively, a credit card can be created that has no fixed number and therefore cannot be stolen. Only the number generated at the instant the card is being used matters. Accordingly, unauthorized use of the card is nearly impossible because no transaction can be conducted with only the partial static part of the credit card number. In one embodiment of the present invention, enough dynamically generated numbers are provided for on the credit card such that a unique credit card number can be generated for each transaction. In this embodiment, the credit card of the present invention effectively acts as a unique per transaction credit card.

In embodiments of the present invention comprising dynamically created credit card numbers, a single credit card can be used for multiple banks. For example, instead of carrying a separate credit card for all the different credit card companies, a customer would only need to carry a single card and one of the inputs on the front of the card can be used to select the appropriate bank or credit provider.

In one embodiment of the present invention, a thin film liquid crystal display ("LCD") can be fitted on the card so the credit card can have a display screen. The display can have multiple uses. In one embodiment, the display can be used to ask the user a security question if an improper password is entered. Or if the fraud protection services need to contact a customer, they can verify the customer's identity by transmitting a security question to the user's credit card screen to which the user would then need to respond correctly using the input buttons on the card.

In one embodiment, the credit card of the present invention could also be used to make online purchases. In this embodiment, the card could use RFID or near field technology so that it can connect to a personal computer and be used to uniquely generate a credit card number for online purchases. The number could also, in one embodiment, be displayed on the front LCD of the card. In one embodiment, the card may also be equipped with a means for communicating with the USB port on the computer in connection with making the online purchases.

TABLE 1

What is claimed is:
1. An apparatus for conducting credit transactions comprising:
  a device with the similar dimensions and thickness to a standard credit card
  an inductor assembly integrated into said device capable of generating a programmed magnetic field at a location on the device where it will come into proximity to a standard credit card magnetic-strip reader
    the inductor assembly being operable to be read by a magnetic pickup of an electronic credit card reader;
    at least one auxiliary rate detection units adjacent to said inductor assembly, wherein said at least one auxiliary detection unit is operable to detect a rate at which said device, including said inductor assembly, is passed through said electronic credit card reader; and
    a microprocessor operatively coupled to said inductor assembly and said at least one detection unit, wherein said microprocessor is operable to simulate magnetic-strip data fields using the inductor assembly, at a rate determined from said auxiliary detection units.
2. A method of Claim 1, wherein the inductor assembly is a planar coil which is a looped inductor with dimension roughly equal to, and along the axis of, the standard credit-card magnetic strip

TABLE 1-continued

3. A method of Claim 1, wherein said detection assembly consists of a plurality of motion rate detection units, which may comprise inductor coils and companion magnetic-field pickup coils, each of which is able to detect the proximity of metallic objects, such as magnetic-strip reader heads, passing through the magnetic field created by said inductor and detected by said pickup coil.
4. A method of Claim 1, wherein said device may incorporate a plurality of touch sensors arranged along the surface of said device which may;
    allow user input of information,
    allow introducing a transaction specific identifier,
    to confirm/deny transaction information,
    to operate in sequence, or with a gesture across said sensor for the purpose lock/unlock or control access for transactions
5. A method of Claim 4, wherein said device contains a real-time clock or counter unit which generates a sequential parameter when the card is read by said credit card reader, and which along with certain user information, transaction identifiers, user secrets, credit card authority secrets is combined to generate a limited-use credit card number, which has a limited recurrence, is limited in scope of use to a predetermined number of authorized transactions
6. A method of Claim 5, wherein the time, sequence, user, credit card authority and other information is similarly combined by credit card processing facility to generate a credit card number for comparison to the number transmitted by the credit card reader, for the purposes of authenticating said number is from a recognized card used in a user-authorized transaction
7. A method of Claim 1, wherein said device incorporates a display allowing credit card number, time, passcodes, sequence codes, amounts and other credit card transaction information to be displayed for user, merchant, bank or credit card authority
8. An Apparatus for conducting credit transactions comprising,
    wherein the edge of said device contains a connector for connection to standard computing devices such as a USB interface.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A payment system comprising:
    a payment card device free of any fixed payment numbers visible thereon and wherein said payment card device is operable for use in payment card reader equipment; and
    a computing device comprising:
    a processor;
    a memory;
    a wireless interface;
    a touch-screen user interface operable to provide a visual user-interface for user payment interactions; and
    a user-input device coupled to the processor, and
    wherein the processor is operable to store a transaction sequence count, a device account number and secrets limited to the computing device, and
    wherein the computing device is operable to receive, store and transmit a card payment information not visible on the payment card device, and
    wherein the processor is operable to generate at least a portion of a limited-use card payment information for use by an authenticated card user, and
    wherein the computing device is operable to convey said limited-use card payment information via an interface of the computing device, and
    wherein a card issuer authority is operable to reject as invalid a transaction attempt outside of its limitations of use,
    wherein a card issuer authority is operable to validate a card payment information as authentic when received from at least one of: an authenticated users payment card; and an authenticated users computing device, and
    wherein the card issuer authority is operable to permit the authentic transactions to complete.

2. The system of claim 1, wherein the touch-screen user interface is operable to control an access for payment transactions by the card device, and is operable to enable as authentic payment transactions by the card device.

3. The system of claim 1, wherein the touch-screen user interface is operable to control an access of the card device for payment transactions at an NFC Card Reader facility, and is operable to enable and disable NFC payment transactions by the card device.

4. The system of claim 3, wherein the touch-screen user-interface is configurable for a locking and unlocking of payment transactions, and
    wherein a card issuer authority is further operable for denying a payment transaction from at least one of:
    a locked card device; and
    a locked card-users computing device, and
    wherein a card issuer authority is further operable to permit as authorized, a card payment transaction from an unlocked device.

5. The system of claim 1, wherein the payment card device is absent a payment number information necessary for completing an online transaction, and
    wherein the information presented on an interface of said card device, are limited to an in-store merchant card reader facility use only.

6. A system of claim 1, wherein:
    the card issuer authority is operable to receive said transacted payment information, and
    wherein a card issuer authority is operable to compute a limited-use payment information from a transaction information, a merchant, a facility information, a sequence counter, a payment card account information, secrets and an information limited to said card device and to said computing device, and
    wherein a card issuer authority is operable to compare said computed payment information to said device transacted information, and
    wherein a card issuer authority is operable to reject as invalid a device transaction used outside of a valid range of device limitations, and
    wherein a card issuer authority is operable to authenticate as valid, a device transaction use within valid range of device limitations.

7. The system of claim 1, wherein the computing device is further operable to transceive the card payment information via the wireless interface for completing an online transaction.

8. The system of claim 1, wherein the computing device is further operable to transceive the limited-use card payment information via an NFC interface of the computing device in an in-store NFC reader facility transaction.

9. The system of claim 1, wherein the computing device is further operable to transceive the limited-use payment information wirelessly with another device via a wireless interface of the computing device, in a device-to-device transaction.

10. The system of claim 1, wherein the computing device is further operable to transmit a payment information visually, in alphanumeric, graphical and iconography via the touch screen user interface.

11. The system of claim 1, further comprising a touch-screen user interface control for a user approving and denying a transaction, and
wherein a card issuer authority is further operable to deny as authentic, a card payment transaction from a user-denied transaction, and to approve as authentic a card payment transaction from a user-approved transaction.

12. The system of claim 1, wherein the computing device is further operable to present at least one challenge, of a set of security challenges comprising:
a card user personal information question,
a card issuer authority security question,
a user touch-screen entry,
a user touch-screen swipe,
a user gesture of a device,
a user passcode entry,
a biometric sensing of a user touch,
a biometric sensing of a recognized user proximity, and
a biometric sensing of a recognized user, and
wherein the computing device is operable to reject and accept a user authorization to use the device based on the security challenge response, and
wherein the computing device is operable to decline performing a payment transaction in the possession of an unauthorized user, and
wherein the computing device is operable to perform a payment transaction while in the possession of a user correctly passing the at least one challenge.

13. The user computing device of claim 12, wherein a payment issuing authority is operable to decline transactions performed by the computing device when a user fails the at least one security challenge.

14. The system of claim 1, wherein a payment issuing authority is operable to decline transactions performed by the payment card device when a user fails at least one security challenge presented to a user by the computing device.

15. A payment system comprising:
a payment card device that is free of any fixed payment numbers disposed thereon and wherein said payment card device is operable for use in a merchant card-reader equipment; and
a card-users personal computing device operable for completing a payment transaction and comprising:
a processor;
a touch-screen display interface;
a user-interface;
a wireless interface; and a memory for storing a payment information accessible to the processor,
wherein the computing device is configured to dynamically generate limited-use payment information, and
wherein the computing device is configured to convey the limited-use payment information on a computing device interface upon the authorization of a valid user, and
wherein a merchant is operable to receive a payment information provided by a personal computing device, and
wherein the limited-use payment information provided by at least one or both of: the payment card device, and the computing device, is validated by a card issuing authority when used in merchant in-store facility transactions, and
wherein a card issuing authority is operable to reject as invalid, a payment information used outside of its valid limitations of use, and
wherein a card issuing authority is operable to validate generated limited-use payment information provided by the computing device in an authorized transaction completed by the computing device.

16. The system of claim 15, wherein the touch-screen user interface is operable for displaying the limited-use payment information, and
wherein a merchant is operable to accept the displayed payment card information in a transaction at a merchant facility.

17. The system of claim 15, wherein the touch-screen display interface is operable to display a merchant facility transaction, and
wherein the touch-screen display interface is operable to accept a user approval and denial of a payment transaction, and
wherein a card issuer authority is further operable to deny a card payment transaction from a user-denied merchant facility transaction, and to approve as authentic a card payment transaction from a user-approved facility transaction.

18. The system of claim 15, wherein a plurality of issuer-provided payment information is wirelessly downloaded into the personal computing device, and
wherein the user-interface is operable for a user selection, of at least one of issuer-provided payment methods via the touch-screen display interface, and
wherein the payment card device is operable for a transaction with a user-selected payment method.

19. The card device of claim 15, wherein the payment card device comprises fixed payment information disposed thereon, and
wherein the fixed payment information comprises only:
a card-holder name;
a payment issuing logo;
a card payment network logo, and
a card reader interface icon, and
wherein the payment card device is free of any account numbers, expiration dates, card security codes, or other fixed payment numbers, disposed thereon.

20. A payment system comprising:
a payment card device, free of any depictions of fixed payment numbers thereon, and operable for use in payment card reader equipment; and
a computing device comprising:
a processor;
a memory;
a wireless interface;
a touch-screen user interface operable to provide a visual user-interface for user payment interactions; and
a user-input device coupled to the processor; and
wherein the memory is operable to store a transaction sequence count, a static device account number and secrets limited to the computing device;
wherein the computing device is operable to receive, store, display and transmit issuer-provided payment information, associated with, but not depicted on, the payment card device;

wherein the processor is operable to dynamically generate at least a portion of a limited-use payment information for use by an authenticated card user, and to combine said at least a portion of the limited-use payment information with at least said static device account number to create combined payment information;

wherein the computing device is operable to convey said combined payment information via an interface of the computing device; and wherein the computing device is operable to receive information, from an issuer, in response to the conveyed combined payment information, indicating that a payment transaction is valid.

21. The system of claim 20 wherein the computing device is operable to wirelessly receive the static device account number.

22. The system of claim 20, wherein the processor is operable to dynamically generate the at least a portion of a limited-use payment information based on a transaction sequence counter count, and further wherein the generated limited-use payment information is valid for a single use.

23. The system of claim 22 wherein the processor is operable to dynamically generate the at least a portion of a limited-use payment information further based on payment processing authority secrets.

24. The system of claim 23 wherein the processor is operable to dynamically generate the at least a portion of a limited-use payment information further based on the static device account number.

25. The system of claim 24 wherein the computing device is operable to wirelessly receive the static device account number.

26. The system of claim 22 wherein the processor is operable to dynamically generate the at least a portion of a limited-use payment information further based on the static device account number.

27. The system of claim 26 wherein the computing device is operable to wirelessly receive the static device account number.

* * * * *